(12) United States Patent
Monroe et al.

(10) Patent No.: US 10,590,334 B2
(45) Date of Patent: Mar. 17, 2020

(54) METHOD OF PUMPING AQUEOUS FLUID CONTAINING SURFACE MODIFYING TREATMENT AGENT INTO A WELL

(71) Applicant: Baker Hughes, a GE company, LLC, Houston, TX (US)

(72) Inventors: Terry D. Monroe, Tomball, TX (US); Sumit Bhaduri, The Woodlands, TX (US); Qi Qu, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/634,619

(22) Filed: Jun. 27, 2017

(65) Prior Publication Data

US 2017/0292064 A1  Oct. 12, 2017

Related U.S. Application Data

(60) Division of application No. 14/643,245, filed on Mar. 10, 2015, now Pat. No. 9,701,892, which is a (Continued)

(51) Int. Cl.
*E21B 43/20* (2006.01)
*C09K 8/72* (2006.01)
(Continued)

(52) U.S. Cl.
CPC ............... *C09K 8/72* (2013.01); *C09K 8/584* (2013.01); *C09K 8/602* (2013.01); *C09K 8/68* (2013.01);
(Continued)

(58) Field of Classification Search
CPC .......... C09K 8/72; C09K 8/584; C09K 8/602; C09K 8/68; C09K 2208/28; E21B 37/06;
(Continued)

(56) References Cited

U.S. PATENT DOCUMENTS

2004/0177957 A1 * 9/2004 Kalfayan ............. C09K 8/5083
166/270
2014/0224492 A1 * 8/2014 Weaver ................. C09K 8/506
166/308.1

* cited by examiner

*Primary Examiner* — Silvana C Runyan
(74) *Attorney, Agent, or Firm* — John Wilson Jones; Jones Delflache LLP

(57) ABSTRACT

A well treatment fluid contains a surface modifying treatment agent having an anchor and a hydrophobic tail. The surface modifying treatment agent is an organophosphorus acid derivative. After the well treatment fluid is pumped into a well penetrating the subterranean formation, the anchor binds to the surface of the formation. The subterranean formation is a siliceous formation or a metal oxide-containing subterranean formation. The anchor bonds to a Si atom when the formation is a siliceous formation and to the metal of the metal oxide when the formation is a metal oxide-containing formation. After being bound to the surface of the formation, frictional drag within the well is reduced. This allows for faster recovery of formation fluids. The bonding of the surface modifying treatment agent onto the formation may further be enhanced by first pre-treating the formation with an aqueous fluid. By increasing the number of sites for the surface modifying treatment agent to bind onto the surface of the subterranean formation, productivity is improved.

19 Claims, 10 Drawing Sheets

Related U.S. Application Data continuation-in-part of application No. 14/491,772, filed on Sep. 19, 2014, now Pat. No. 9,822,621, and a continuation-in-part of application No. 14/491,905, filed on Sep. 19, 2014, now Pat. No. 9,683,431.

(60) Provisional application No. 62/007,708, filed on Jun. 4, 2014, provisional application No. 61/989,267, filed on May 6, 2014, provisional application No. 61/981,051, filed on Apr. 17, 2014, provisional application No. 61/880,836, filed on Sep. 20, 2013.

(51) Int. Cl.
| | | |
|---|---|---|
| *C09K 8/584* | (2006.01) | |
| *C09K 8/60* | (2006.01) | |
| *C09K 8/68* | (2006.01) | |
| *C09K 8/74* | (2006.01) | |
| *C09K 8/86* | (2006.01) | |
| *E21B 37/06* | (2006.01) | |
| *E21B 41/00* | (2006.01) | |
| *E21B 43/16* | (2006.01) | |
| *E21B 43/24* | (2006.01) | |
| *E21B 43/25* | (2006.01) | |
| *E21B 43/26* | (2006.01) | |

(52) U.S. Cl.
CPC .................. *C09K 8/74* (2013.01); *C09K 8/86* (2013.01); *E21B 37/06* (2013.01); *E21B 41/00* (2013.01); *E21B 43/16* (2013.01); *E21B 43/20* (2013.01); *E21B 43/24* (2013.01); *E21B 43/25* (2013.01); *E21B 43/26* (2013.01); *C09K 2208/28* (2013.01)

(58) Field of Classification Search
CPC .......... E21B 41/00; E21B 43/16; E21B 43/20; E21B 43/25; E21B 43/26
USPC ....................................................... 166/279
See application file for complete search history.

METHOD OF PUMPING AQUEOUS FLUID CONTAINING SURFACE MODIFYING TREATMENT AGENT INTO A WELL

This application is a divisional application of U.S. Pat. No. 9,701,892 B2 filed on Mar. 10, 2015 which claims the benefit of U.S. Pat. No. 9,822,621 B2 filed on Sep. 19, 2014 which claims the benefit of U.S. patent application Ser. No. 61/880,836, filed on Sep. 20, 2013 and U.S. Pat. No. 9,683,431 B2 filed on Sep. 19, 2014; both U.S. Pat. Nos. 9,822,621 B2 and 9,683,431 B2 further claiming the benefit of U.S. patent application Ser. No. 61/880,840 filed on Sep. 20, 2013 and U.S. patent application Ser. No. 61/981,051, filed on Apr. 17, 2014 and U.S. patent application Ser. No. 61/989,267, filed on May 6, 2014 and U.S. patent application Ser. No. 62/007,708, filed on Jun. 4, 2014, all of which are herein incorporated by reference.

FIELD OF THE DISCLOSURE

The disclosure relates to a method of treating a subterranean formation with a surface modifying treatment agent having an anchor and a hydrophobic tail by pumping into a well an aqueous well treatment fluid comprising the surface modifying treatment agent.

BACKGROUND OF THE DISCLOSURE

Alternatives for enhancing the productivity of hydrocarbons from hydrocarbon producing reservoirs have included methods which increase the permeability of the formation penetrated by the well. Other methods have been directed to those which increase the oil/water production ratios within the well. Others have been drawn improved methods for inhibiting the formation of undesirable materials in the formation including water borne scales, asphaltenes, salts, paraffins, etc. Some of these methods have involved the development of well treatment chemicals for enhancing productivity.

Attention has further been focused on improving methods of stimulating formations. Since well productivity depends on the ability of a fracture to conduct hydrocarbons from the formation to the wellbore, fracture conductivity has been an important parameter in determining the degree of success of a stimulation operation. The creation and/or mobilization of reservoir "fines" during fracturing and production has been instrumental in reducing fracture conductivity and reducing reservoir permeability due to plugging of pore throats by the fines. While the use of coated particulates, such as proppants, has been successful in minimizing the generation of fines, alternatives have been sought.

Alternatives have also been sought to decrease unnecessary water production during the treatment of subterranean formations. Excessive water production has a direct effect on the productivity of the well. The amount of oil and/or gas that may be ultimately recovered from the well is decreased since the water takes the place of other fluids that may flow or be lifted from the well. This increases the cost of production from the well.

While well treatment agents have been developed for the treatment or control of the deposition of scales, salts, paraffins, and asphaltenes within the well, less than desirable results are often achieved. Alternatives have therefore been sought for improving the overall efficiency of the well by controlling the deposition of such materials. Alternatives have especially been sought for controlling the deposition of such materials in low permeability formations, such as shale and coal.

Resources have also been spent on both chemical and physical techniques for effectively reducing frictional drag created during the flow of hydrocarbons within a hydrocarbon producing reservoir.

Alternatives for reducing friction have focused on drag reduction agents. Typically, friction reduction agents are large polymers with long chains which tend to build non-Newtonian gel structures. Drag reducing gels are shear-sensitive and often require specialized injection equipment (such as pressurized delivery systems). Further, since friction reduction agents are typically highly viscous, usually no more than 10 weight percent of polymeric friction reduction agents are present in the carrier fluid. Some attention has been focused on the use of slurries or dispersions of polymers to form free-flowing and pumpable mixtures in liquid media. However, such polymers often agglomerate over time, thus making it very difficult for them to be placed in hydrocarbon liquids where reduced drag is needed.

Further alternatives for lowering the frictional drag of fluids within a well have been sought in order to enhance the productivity of hydrocarbons from the well.

Well treatment agents having sites which are reactive with oxides and/or hydroxides of a subterranean formation typically form precipitates when exposed to water. The formation of such precipitates destroys or seriously weakens the reactive sites of the well treatment agent. It is for this reason that well treatment agents reactive with oxides and/or hydroxides typically are pumped into a well in a carrier fluid which is non-aqueous. In addition, such well treatment agents are typically stored by being formulated in non-aqueous solvents. It is desirable for such well treatment agents to be pumped and stored as aqueous fluids while maintaining the activity of the well treatment agent.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method of treating a siliceous or metal oxide-containing subterranean formation is provided. In this embodiment, an aqueous treatment fluid is prepared which contains a surface modifying treatment agent having an anchor and a hydrophobic tail. The surface modifying treatment agent may be pumped into a well in an aqueous media. The aqueous media contains an organic acid. After being pumped into the well, the surface modifying treatment agent is bound to a surface of the subterranean formation by attaching the anchor to the formation.

In another embodiment of the disclosure, an alternative method of treating a siliceous or metal oxide-containing subterranean formation is provided. In this embodiment, an aqueous treatment fluid is pumped into a well which penetrates the subterranean formation. The treatment fluid contains a surface modifying treatment agent and an aqueous media comprising an organic acid. The surface modifying treatment agent has an anchor and a hydrophobic tail. The surface modifying treatment agent is bound to a surface of the subterranean formation by attaching the anchor to the formation. The surface modifying treatment agent is aligned to the siliceous or metal oxide-containing subterranean formation such that the hydrophobic tail is directed away from the surface of the formation.

In an embodiment of the disclosure, the amount of organic acid in the aqueous media is between from about 0.5 to about 25 volume percent.

In another embodiment, the organic acid of the aqueous media is acetic acid, formic acid, citric acid, oxalic acid, malonic acid, succinic acid, malic acid, tartaric acid, phthalic acid ethylenediaminetetraacetic acid (EDTA), nitrilotriacetic acid, glycolic acid, N-hydroxyethyl-N,N',N'-ethylenediaminetriacetic acid, hydroxyethyliminodiacetic acid, diethylenetriaminepentaacetic acid or cyclohexylenediaminetetraacetic acid or a mixture thereof.

In another embodiment of the disclosure, the anchor of the surface modifying treatment agent is a metal and the hydrophobic tail is an organo-silicon material, a fluorinated hydrocarbon or both an organo-silicon material and a fluorinated hydrocarbon.

In another embodiment of the disclosure, the anchor of the surface modifying treatment agent is an organophosphorus acid derivative and the hydrophobic group is attached to the organophosphorous acid derivative.

Accordingly, the present disclosure relates to an aqueous well treatment fluid containing a surface modifying treatment agent having a hydrophobic tail and an anchor. The present disclosure further relates to pumping of the aqueous well treatment fluid into a well penetrating a subterranean formation. In addition, the present disclosure relates to an aqueous medium for storage of the surface modifying treatment agent.

Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
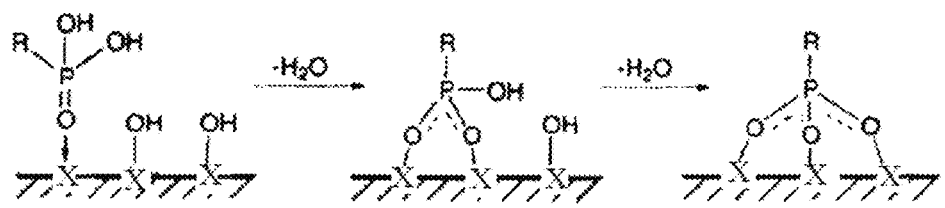
FIG. 1 depicts a schematic representation of the attachment of a surface modifying treatment agent having a hydrophobic tail and an anchor of an organophosphorus acid derivative.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims may refer to particular components, process steps or well treatment operations. As one skilled in the art will appreciate, different persons may refer to a component, a process step or a well treatment operation by different names. This document does not intend to distinguish between components, process steps or well treatment operations that differ in name but not function or operation. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

A surface modifying treatment agent having an anchor and a hydrophobic tail may be pumped into a well in an aqueous fluid. The aqueous fluid contains an organic acid. The well treatment fluid containing the surface modifying treatment agent may be prepared by combining the surface modifying treatment agent with an aqueous media containing the organic acid.

The organic acid of the aqueous treatment fluid is preferably a weak organic acid such as acetic acid, formic acid, citric acid, oxalic acid, malonic acid, succinic acid, malic acid, tartaric acid, phthalic acid ethylenediaminetetraacetic acid (EDTA), nitrilotriacetic acid, glycolic acid, N-hydroxyethyl-N,N',N'-ethylenediaminetriacetic acid, hydroxyethyliminodiacetic acid, diethylenetriaminepentaacetic acid, cyclohexylenediaminetetraacetic acid or a mixture thereof. In a preferred embodiment, the organic acid of the aqueous media is selected from the group consisting of acetic acid, formic acid, citric acid and mixtures thereof.

Typically, the amount of organic acid in the aqueous media is between from about 0.5 to about 25 volume percent.

The surface modifying treatment agent is pumped into the formation as a component of an aqueous treatment fluid. The aqueous well treatment fluid may be prepared on the fly. The aqueous treatment fluid may be pumped into the formation any time during the well treatment operation. In an embodiment, the aqueous well treatment fluid may be a fracturing fluid, pad fluid, acidizing fluid, etc.

The concentration of the surface modifying treatment agent in the aqueous well treatment fluid is typically between from about 0.01% to 100% or more typically between from about 0.1% to about 20% (v/v).

The surface modifying treatment agent comprises an anchor and a hydrophobic tail. For purposes herein, the term "hydrophobic tail" shall refer to the hydrophobic substituent of the surface modifying treatment agent. The "anchor" refers to the non-hydrophobic portion of the surface modifying treatment agent derivative. The anchor provides the site of attachment of the surface modifying treatment agent onto the subterranean formation. For instance, the anchor may be engaged in covalently connecting the surface modifying treatment agent to a surface of the subterranean formation.

The hydrophobic tail may be directly attached to the anchor. Alternatively, the hydrophobic tail may be indirectly attached to the anchor such that an organo-functional group is between the anchor and the hydrophobic tail. For instance, the hydrophobic tail and the anchor may be separated by a hydrocarbyl group such as a saturated or unsaturated alkylene, alkenyl, alkynyl, etc.

While the tail of the treatment agent exhibits hydrophobic characteristics, it may also exhibit oleophobic properties. The treatment agent may therefore be considered to be omniphobic.

The hydrophobic tail of the surface modifying treatment agent is not believed to bind to the subterranean substrate. The tail of the surface modifying treatment agent is only indirectly attached to the formation substrate, through the anchor.

In an embodiment, the tail of the surface modifying treatment agent self-aligns with the formation substrate to form a monolayer or multi-layer assembly. It is believed that this occurs by chemical binding-induced spontaneous organization of the tail on the substrate surface. The tail of the surface modifying treatment agent may be aligned such that the hydrophobicity character of the treatment agent is imparted away from the surface of the subterranean formation. In a preferred embodiment, the tail may self-align to the surface of the siliceous or metal oxide containing formation such that the hydrophobic/omniphobic tail is opposite to the surface of the formation.

The surface modifying treatment agent, when bound to a surface of a substrate, reduces friction of a fluid within the well. Water and thus aqueous fluids within the well may easily slide across the surface of the substrate carrying hydrocarbons with it as lateral adhesion of the fluid to the formation surface is reduced. Thus, the hydrophobic tail lowers water saturation and enhances recovery of water from the formation surface.

The subterranean formation, onto which the surface modifying treatment agent is bond, may be a siliceous formation, such as sandstone, as well as a metal oxide containing formation, including carbonate formations. The formation may be enriched in clay and the metal may include alumina.

In a preferred embodiment, the anchor of the surface modifying treatment agent may be an organophosphorus acid derivative with the hydrophobic group attached to the anchor. In another preferred embodiment, the anchor of the surface modifying treatment agent may be a metal and the hydrophobic tail may be an organo-silicon material, a fluorinated hydrocarbon or both an organo-silicon material and a fluorinated hydrocarbon.

Organophosphorus as Anchor

The organophosphorus acid derivative comprising the anchor of the surface modifying treatment agent may originate from an organophosphoric acid, organophosphonic acid or organophosphinic acid. The organo groups of the anchor may be monomeric or polymeric.

Examples of monomeric phosphoric acid derivatives are compounds or mixtures of compounds having the structure $(RO)_x$—P(O)—$(OR')_y$ wherein x is 1-2, y is 1-2 and x+y=3; R preferably is a radical having a total of 1-30, preferably 2-20, more preferably 6-18 carbons; R' is H, a metal such as an alkali metal, for example, sodium or potassium or lower alkyl having 1 to 4 carbons, such as methyl or ethyl. Preferably, a portion of R' is H. The organic component of the phosphoric acid (R) can be a saturated or unsaturated aliphatic group or can be an aryl or aryl-substituted moiety. At least one of the organo groups can contain terminal or omega functional groups as described below.

Examples of monomeric phosphonic acid derivatives include compounds or mixtures of compounds having the formula:

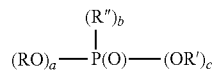

wherein a is 0-1, b is 1, c is 1-2 and a+b+c is 3; R and R" preferably are each independently a radical having a total of 1-30, preferably 2-20, more preferably 6-18 carbons; R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be a saturated or unsaturated aliphatic group or an aryl or aryl-substituted moiety. At least one of the organo groups can contain terminal or omega functional groups as described below.

Examples of monomeric phosphinic acid derivatives are compounds or mixtures of compounds having the formula:

wherein d is 0-2, e is 0-2, f is 1 and d+e+f is 3; R and R" preferably are each independently radicals having a total of 1-30, preferably 2-20 carbons atoms, more preferably 6-18 carbons; R' is H, a metal, such as an alkali metal, for example, sodium or potassium or lower alkyl having 1-4 carbons, such as methyl or ethyl. Preferably a portion of R' is H. The organic component of the phosphinic acid (R, R") can be a saturated or unsaturated aliphatic group or be an aryl or aryl-substituted moiety. Examples of organo groups which may comprise R and R" include long and short chain aliphatic hydrocarbons, aromatic hydrocarbons and substituted aliphatic hydrocarbons and substituted aromatic hydrocarbons.

At least one of the organo groups can further contain one or more terminal or omega functional groups which are hydrophobic. Examples of terminal or omega functional groups include carboxyl such as carboxylic acid, hydroxyl, amino, imino, amido, thio and phosphonic acid, cyano, sulfonate, carbonate and mixed substituents.

Representative of organophosphorus acid derivatives are amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, styrene phosphonic acid, and dodecyl bis-1,12-phosphonic acid.

In addition to monomeric organophosphorus acid derivatives, oligomeric or polymeric organophosphorus acid derivatives resulting from self-condensation of the respective monomeric acids may be used.

In a preferred embodiment, the surface modifying treatment agent is of the formula $R_f$—$(CH_2)_p$—Z where Z, the anchor is H, F or an acid derivative, and the hydrophobic tail (bonded to the anchor) is a fluorine containing moiety, such as $R_f$—$(CH_2)_p$— where $R_f$ is a perfluorinated alkyl group or a perfluorinated alkylene ether group and p is 2 to 4, preferably 2.

Typically, the fluorine containing moiety has a number average molecular weight of less than 2000.

Examples of perfluorinated groups for the fluorine containing moiety are those of the structure:

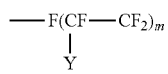

where Y is F or $C_nF_{2n+1}$; m is 4 to 20 and n is 1 to 6.

A preferred oligomeric or perfluoroalkylene ether group is where R and/or R" is a group of the structure:

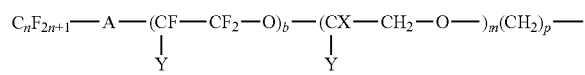

where A is an oxygen radical or a chemical bond such as $CF_2$; n is 1 to 20, preferably 1 to 6; Y is H, F, $C_nH_{2n+1}$ or $C_nF_{2n+1}$; b is at least 1, preferably 2 to 10, m is 0 to 50, and p is 1 to 20.

In an embodiment, the surface modifying treatment agent is of the formula $R_f$—$(CH_2)_p$—Z, wherein Z is:

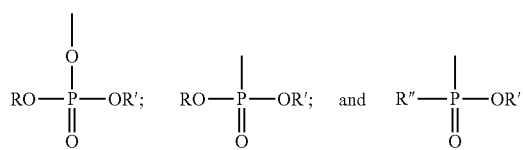

where R and R" are a hydrocarbon or substituted hydrocarbon radical having up to 200, such as 1 to 30 and 6 to 20 carbons, R and R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

In an embodiment, the surface modifying treatment agent is of the formula $CF_3(C_nF_{2n})CH_2CH_2PO_3H_2$ where n is between 3 and 5 or $CF_3(CF_2)_xO(CF_2CF_2)_y$—$CH_2CH_2$—$PO_3H_2$ where x is from 0 to 7, y is from 1 to 20 and x+y is less than or equal to 27.

Where the surface modifying treatment agent contains an organophosphorus acid derivative and without being bound to any theory, it is believed that upon being pumped into the formation, a silicon atom of the siliceous subterranean formation covalently interacts with the anchor of the surface modifying treatment agent to form a Si—O—P covalent bridge. The bridges are believed to result from the condensation of hydroxyl groups on the surface of the formation with P—OH groups. Thus, exemplary bonding of the anchor and the surface of the substrate formation may be represented as —O—P—O—Si—. The hydrophobic tail of the surface modifying treatment agent is thus attached to the siliceous formation through the intermediary —O—P—O bond. The anchor of the surface modifying treatment agent thus forms a covalent bond with the hydroxyl reactive group on the surface of the siliceous formation. A complexation of the phosphoryl oxygen surface X atom is believed to form.

Upon being pumped into a metal oxide-containing formation, the anchor of the surface modifying treatment agent having an organophosphorus acid derivative is believed to covalently interact with a metal atom ("M") of the metal oxide surface of the subterranean formation to form a M-O—P covalent bridge. The bridges are believed to result from the condensation of hydroxyl groups on the surface of the formation with P—OH groups. Thus, exemplary bonding of the anchor and the surface of the substrate formation may be represented as —O—P—O-M-. The hydrophobic tail of the surface modifying treatment agent is thus attached to the metal oxide-containing formation through the intermediary —O—P—O bond. The anchor of the surface modifying treatment agent thus forms a covalent bond with the oxide reactive group on the surface of the formation. A complexation of the phosphoryl oxygen surface metal atom is believed to form.

FIG. 1 depicts a schematic representation of the formation of a tridentate phosphonate surface species by coordination and condensation to the surface of a formation, wherein X is either —Si (of a siliceous formation) or -M (of a metal oxide-containing formation).

Organo-Silicon and/or Fluorinated Hydrocarbon as Anchor

In an embodiment, the surface modifying treatment agent contains a metal linked to an organo-silicon containing material or a fluorinated hydrocarbon.

The anchor of the surface modifying treatment agent may be a metal. For instance, the anchor may be a Group 3, 4, 5, or 6 metal. In a preferred embodiment, the metal is a Group 4 metal, such as Ti, Zr or Hf, a Group 5 metal, such as Ta or Nb, a Group 6 metal, such as W, or a metal of the lanthanide series, such as La.

The hydrophobic tail of the surface modifying treatment agent may be an organo-silicon material, a fluorinated hydrocarbon or both a hydrophobic organo-silicon material and a fluorinated hydrocarbon.

The surface modifying treatment agent may be represented by the formula J-K, wherein K is the metallic anchor (such as that represented by a metal containing organic ligand) and J is the hydrophobic tail represented by the organo-silicon containing material, the fluorinated hydrocarbon or a combination of organo-silicon containing material and fluorinated hydrocarbon.

While not being bound to any theory, it is believed that upon being pumped into the formation, the metal of the surface modifying treatment agent covalently binds to the formation. The formation may be a siliceous formation or a metal oxide containing formation, including carbonate formations. The metal oxide containing formation may be alumina. The metal may therefore be referred to as the "anchor" of the surface modifying treatment agent, a site that engages in covalently connecting the treatment agent to the surface of the formation. It is believed that the metal of the surface modifying treatment agent binds to the oxygen atom of the silicon-oxo or the metal-oxo linkage of the formation.

Figure 2:
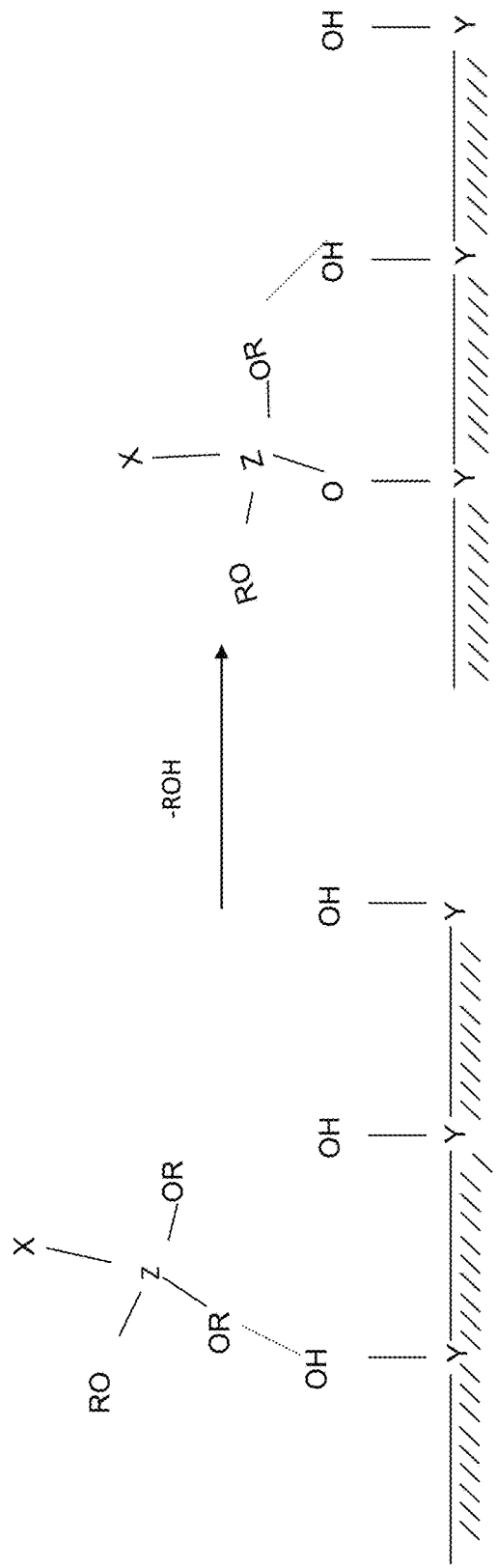
FIGS. 2 and 3 depict schematic representations of the attachment of a surface modifying treatment agent having a metallic anchor and a hydrophobic tail to the surface of a subterranean formation.
Figure 3:
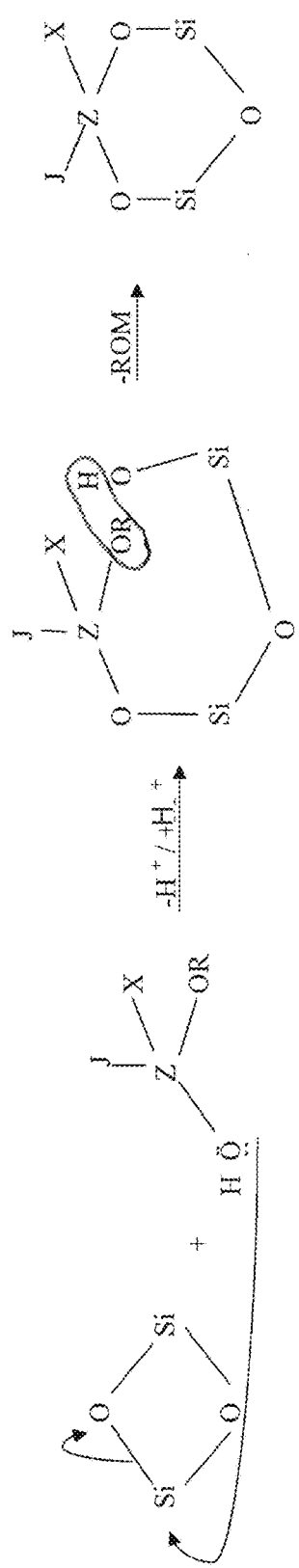

FIG. 2 and FIG. 3 depict schematic representations of the attachment of the surface modifying treatment agent onto the substrate wherein Z is the metal of the anchor, J is the hydrophobic tail and Y is either —Si (of a siliceous formation) or the metal (M) (of a metal oxide-containing formation). In FIG. 2, the surface of the formation contains a free —OH which may, for example, be attached to an aluminum atom or a silicon atom. As illustrated, the metal of the surface modifying treatment agent may bind to the oxygen atom of the silicon-oxo or the aluminum-oxo linkage of the substrate by reaction with the —OH group. In FIG. 3, the surface of the formation is shown as containing a silicon-oxo group without a free —OH. The mechanism of reaction of the surface modifying treatment agent is illustrated as being different from that set forth in FIG. 3.

The organo-silicon or fluorinated hydrocarbon portion of the surface modifying agent is attached to the metal forming the anchor and is not believed to bind to the subterranean substrate. It is therefore referred to as the "tail" portion of the surface modifying treatment agent. Thus, the tail of the surface modifying treatment agent is only indirectly attached to the formation substrate, through the metal.

The tail of the surface modifying treatment agent may be aligned such that the hydrophobicity character of the treatment agent is imparted away from the anchor.

The surface modifying treatment agent may be formed by reacting a metal containing organic ligand with the organo-silicon containing material and/or fluorinated hydrocarbon group.

The metal containing organic ligand may be formed by reacting a metal compound, such as a metal halide, like $TaCl_5$, with an oxygen containing ligand. The number of oxygen containing ligands attached to the metal is typically equal to the valency of the metal atom. Thus, depending upon the position of the transition metal on the Periodic Chart, the metal containing organic ligand may have from two to six organic ligand groups.

In an embodiment, the ligand of the metal containing organic ligand contains an alkoxide or ester. Suitable organometallic derivatives include metal derivatives of $C_1$ to $C_{18}$ alkoxides, preferably alkoxides containing from 2 to 8 carbon atoms such as ethoxide, propoxide, isopropoxide, butoxide, isobutoxide and tertiary butoxide. For instance, the metal containing organic ligand may be a transition metal tetra-alkoxide, such as zirconium tetra tert-butoxide.

The alkoxides may be in the form of simple esters and polymeric forms of the alkoxylates and esters as well as various chelates and complexes. For example, with the metal Ta, the simple esters could be $Ta(OR)_5$ where R is $C_1$ to $C_{18}$ alkyl. Polymeric esters may be obtained by condensation of an alkyl ester and can have the structure RO—$[Ta(OR)_3$—O-$]_x$—R where R is defined above and x is a positive integer.

Further, the organometallic compound can include, for instance, when the metal is titanium or zirconium:

(a) alkoxylates having the general formula $M(OR)_4$, wherein M is selected from Ti and Zr and R is $C_{1-18}$ alkyl;

(b) polymeric alkyl titanates and zirconates obtainable by condensation of the alkoxylates of (a), i.e., partially hydrolyzed alkoxylates of the general formula RO[-M(OR)$_2$O—]$_{x-1}$R, wherein M and R are as above and x is a positive integer;

(c) titanium chelates, derived from ortho titanic acid and polyfunctional alcohols containing one or more additional hydroxyl, halo, keto, carboxyl or amino groups capable of donating electrons to titanium. Examples of these chelates are those having the general formula $Ti(O)_a(OH)_b(OR')_c(XY)_d$, wherein a=4−b−c−d; b=4−a−c−d; c=4−a−b−d; d=4−a−b−c; R' is H, R as above or X—Y, wherein X is an electron donating group such as oxygen or nitrogen and Y is an aliphatic radical having a two or three carbon atom chain such as:

(i) —$CH_2CH_2$—, e.g., of ethanolamine, diethanolamine and triethanolamine, or

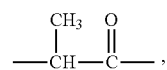

(ii) lactic acid,

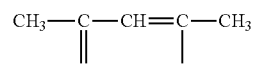

(iii) acetylacetone enol form, and

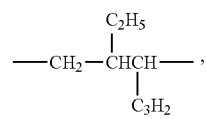

(iv) 1,3-octyleneglycol, (d) titanium acrylates having the general formula $Ti(OCOR)_{4-n}(OR)_n$ wherein R is $C_{1-18}$ alkyl as above and n is an integer of from 1 to 3, and polymeric forms thereof, or (e) mixtures thereof.

Acetyl acetonates, alkanolamines, lactates and halides, such as chloride, can also be used as the ligand of the oxygen containing organic ligand. In addition, the oxygen containing ligand can contain a mixture of ligands selected alkoxides, acetyl acetonates, alkanolamines, lactates and halides.

In an embodiment, the organo-silicon containing material may be a silane, polysiloxane or a polysilazane.

Examples of organo-silicon containing materials are those having the formula $R^1_{4-x}SiA_x$ or $(R^1_3Si)_yB$ as well as organo(poly)siloxanes and organo(poly)silazanes containing units of the formula:

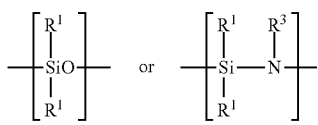

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5{}_2SiO_2$ where $R^5$ is a halogen such as a chloro or fluoro substituent.

In an embodiment, the organo-silicon containing compound may be an organo(poly)siloxane or organo(poly)silazane of a number average molecular weight of at least 400, usually between 1000 and 5,000,000.

The substituent A in $R^1{}_{4-x}SiA_x$ may be hydrogen, a halogen such as chloride, OH, $OR^2$ or

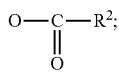

wherein B in the above structural formula may be $NR^3{}_{3-y}$, $R^2$ a hydrocarbon or substituted hydrocarbon radical containing from 1 to 12, typically 1 to 4 carbon atoms. $R^3$ is hydrogen or has the same meaning as $R^1$, x is 1, 2 or 3, y is 1 or 2.

Preferably, $R^1$ is a fluoro-substituted hydrocarbon. Preferred are such fluoro-substituted hydrocarbons are those of the structure:

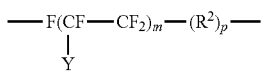

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

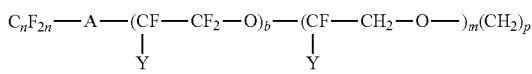

where A is an oxygen radical or a chemical bond; n is 1 to 6, y is F or $C_nF_{2n}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like $Ta(EtO)_4acac$:PFOSi; tantalum alkoxy-alkylsilylhalide; tantalum halide-polyalkylsiloxane, like $TaCl_5$:PDMS; niobium alkoxide-perfluoroalkoxysiloxane, such as $Nb(EtO)_5$:PFOSi and $Ta(EtO)_5$:PFOSi; titanium alkoxide-perfluoroalkoxysiloxane, like $Ti(n-BuO)_4$:PFOSi; zirconium alkoxide-perfluoroalkoxysiloxane; lanthanum alkoxide-perfluoroalkoxysilane, like $La(iPrO)_3$:PFOSi; tungsten chloride-perfluoroalkoxysiloxane, like $WCl_6$:PFOSi; tantalum alkoxide-polyalkylsiloxane, like $Ta(EtO)_5$:PDMS; and tantalum alkoxyacetylacetonate-polyalkylsiloxane, like $Ta(EtO)_4acac$:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as a is carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—$(CFY-CF_2)_m$ where Y is F or $C_nF_{2n+1}$; m is 4 to 20 and n is 1 to 6.

Examples of perfluoroalkylene ether groups are those of the structure:

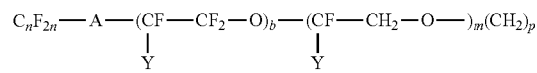

where A is an oxygen radical or a chemical bond; n is 1 to 6, Y is F or $C_nF_{2n}$; b is 2 to 20, m is 0 to 6, and p is 0 to 18, preferably 2 to 4 and more preferably 2.

Preferred fluorinated materials are esters of perfluorinated alcohols such as the alcohols of the structure F—$(CFY-CF_2)_m$—$CH_2$—$CH_2$—OH where Y is F or $C_nF_{2n+1}$; m is 4 to 20 and n is 1 to 6.

Further preferred as fluorinated hydrocarbons are perfluorinated hydrocarbons of the structure $R_f$—$(CH_2)_p$—X where $R_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

Further preferred as fluorinated hydrocarbons are perfluorinated hydrocarbons of the structure $R_f$—$(CH_2)_p$—Z where $R_f$ and p are as defined above, preferably $R_f$ is a perfluoroalkylene ether group such as those described above, and p is from 2 to 4, and Z is a phosphorus acid group. Examples of phosphorus acid groups are:

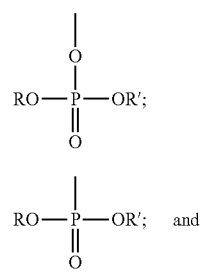

-continued

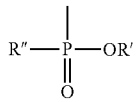

III where R″ is a hydrocarbon or substituted hydrocarbon radical having up to 200, such as 1 to 30 and 6 to 20 carbons, R″ can also include the perfluoroalkyl groups mentioned above, and R′ is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Preferably, the phosphorus acid is of formula II where R and R′ are H.

Suitable methods for preparing the surface modifying treatment agents wherein the organo portion of the metal containing organic ligand is reactive with the organo-silicon containing material or fluorinated hydrocarbon group are disclosed in U.S. Pat. Nos. 7,879,437 and 8,067,103. In one embodiment, for instance, the organo portion of the organometallic compound may be selected from those groups that may be reactive with the acids (or their derivatives) of a perfluoroalkylene ether.

As an example, the surface modifying treatment agent could be prepared by mixing the metal containing organic ligand and the silicon-containing material or fluorinated hydrocarbon in a closed system to avoid hydrolysis of the reactants. Reaction can occur neat or in the presence of a non-reactive solvent such as chlorinated or fluorinated solvent, for example, methylene chloride. Heat may be used to initiate and complete the reaction. Solvent may be removed by evaporation and the reaction product can be redissolved in a suitable solvent such as an alcohol, for example, ethanol or propanol, for application to the substrate. The mole ratio of the organosilicon-containing material to the metal containing organic ligand is typically from 100:1 to 1:100, preferably from 1:1 to 10:1 depending on the valence of the metal of the metal containing organic ligand. For example, the molar ratio of organosilicon compound to Ta(V) is typically 5 to 1.

In an embodiment, the surface modifying treatment agent may be represented by the formula $X_a(OR)_bM$, wherein OR is a $C_1$ to $C_{18}$ alkoxide, X is the hydrophobic tail represented by the organo-silicon material or the fluorinated hydrocarbon, M is metal of the metal containing organic ligand and a+b equals the valency of M and further wherein neither a nor b are zero.

In an exemplary embodiment, the surface modifying agent may be formed by reacting an organosilicon compound such as an organosilane or a polysiloxane with a metal containing organic ligand, such as a derivatized alkoxide. The metal of the metal containing organic ligand is covalently bonded to the organosilicon compound to form the anchor and the hydrophobic tail.

An exemplary reaction scheme of the surface modifying treatment agent, $X_a(OR)_bM$, with a siliceous formation, —(—O—Si—O—Si—)$_n$, may be represented as:

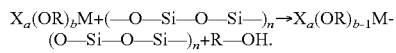

The surface modifying treatment agents disclosed herein are effective in reducing frictional drag of a fluid within a hydrocarbon producing reservoir. The frictional drag may be created during the turbulent flow of fluids within the well. When bound to the surface of a substrate, the surface modifying treatment agents disclosed herein reduce the sliding angle between the fluid and the substrate within the well. The reduction in sliding angle may be between hydrocarbons and a substrate treated with the surface modifying treatment agent. Further, the reduction in sliding angle may be between water (aqueous phase) and a substrate treated with the surface modifying treatment agent. Fluid flow improvement has been evident in both hydrocarbon and aqueous phases.

The reduction in frictional drag within the well is thus attributable to the bonding of the surface modifying treatment agent onto the surface of the substrate. Thus, the modification of the substrate surface reduces drag and provides improved flow of hydrocarbon (or water phase) from the well. Productivity of the hydrocarbon producing well is thus enhanced by use of the surface modifying treatment agents.

The surface modifying treatment agents disclosed herein are of particular value in the reduction of frictional drag during the pumping of produced hydrocarbons from the hydrocarbon producing reservoir.

The reduction in sliding angle further is of benefit in enhancing load recovery of water by increasing the recovery of flowback water from the well after a fracturing fluid has been returned to the surface.

As used herein, the sliding angle (also known as tilting angle) is a measurement of the lateral adhesion of the drop to the substrate surface. Thus, the sliding angle of a fluid on a substrate having a surface modifying treatment agent bonded thereto is less than the sliding angle of the same fluid on the (same) substrate ("pristine unmodified substrate") which does not have the surface modifying treatment agent bonded thereto. Where the surface modifying treatment agent is bond only to a portion of the substrate, the sliding angle of the drop of fluid on the portion of the substrate having the surface modifying treatment agent bonded thereto is less than the sliding angle of the fluid on the substrate not having the surface modifying treatment agent bonded thereto.

The reduction in frictional drag during the production of hydrocarbons from the well is thus measured by a reduction in the sliding angle of the fluid with the formation surface. The reduction in adhesion bond strength results in reduced drag between the liquid and the solid surface, allowing for easier fluid flow at a given stress. The decrease in sliding angle accelerates the flow of fluid from the well by lessening the amount of fluid trapped within the formation.

In an embodiment, the sliding angle of a fluid to a substrate surface treated with the surface modifying treatment agent may be less than or equal to 60°; in some cases, less than or equal to 20°; in other cases, less than or equal to 10° and in some other cases, less than or equal to 5°. In one instance, the sliding angle for hydrocarbons has been observed to be less than 10°. In another instance, the reduction in lateral adhesion of a fluid has been observed by a reduction in the sliding angle from 80° (non-treated substrate) to 40° (treated substrate).

The reduction in sliding angle is independent of the contact angle. The contact angle refers to the angle between a drop of the liquid and the surface of the substrate. A high contact angle reduces the normal adhesion of a liquid droplet to the solid surface due to a reduction of the liquid-solid contact area.

The contact angle is a measure of hydrophobicity. Typically, a liquid is considered to be "non-wet" or hydrophilic when the contact angle is less than 90° and "non-wetting" or hydrophobic when the contact angle is greater than 90°. A surface having a water contact angle greater than 150° is usually termed "ultra-hydrophobic" characterizing a water-repellant surface. A superhydrophobic surface may have a contact angle hysteresis less than 10°; in some cases, less than 5°. When the contact angle is less than 90°, the wetting tendency of the surface modified substrate may greater when the substrate is rough versus smooth. When the contact angle is greater than 90°, the substrate may repel more when the substrate is rough.

Since hydrophobicity prevents the formation of water blocks on the surface of the substrate, the contact angle is indicative of the capillary pressure within the substrate. Whereas the contact angle is representative of static conditions, the sliding angle is representative of fluid movement downhole. No relationship can be drawn between the contact angle and sliding angle. As such, the contact angle provides no indication of the sliding angle. Improvement in frictional drag has been seen with a reduced sliding angle and a contact angle less than or equal to 20°. Further, improvements in frictional drag have been observed with a reduced sliding angle and a contact angle greater than or equal to 120°. For instance, the effectiveness of surface modifying treatment agents on substrate surfaces to reduce frictional drag has been seen with fluids exhibiting a contact angle less than 20° and a sliding angle less than 20° and a contact angle greater than 120° and a sliding angle less than 20°.

The surface modifying treatment agents disclosed herein may further alter the surface energy of the formation being treated.

The attachment of the anchor of the surface modifying treatment agent onto the formation prevents spalling of fines and in-situ fines generation is minimized or stabilized. Spalling of fines may be prevented by altering the zeta potential of formation fines. For instance, where the surface modifying treatment agent contains a metallic anchor, by covalently attaching the metal-containing ligand onto the Si or Al surface, migration of fines into producing areas of the formation may be minimized.

The hydrophobic nature of the tail further alters the wettability of the formation surface. The self-assembled hydrophobic monolayer covalently attached to the formation surface lowers the water saturation and enhances recovery of water from the formation surface.

Particulates of a weakly consolidated, semi consolidated or unconsolidated formation may further be consolidated by use of the surface modifying treatment agents disclosed herein. The bonding of the anchor of the treatment agent on the surface formation prevents or minimizes the influx of fluids into the formation. Aggregation of the particulates results from the reduction in charge density.

Upon being pumped into the formation, the surface modifying treatment agent may enter into the pore spaces of the formation. Multiple interactions of molecules of the surface modifying treatment agent with formation particulates causes aggregation or agglomeration of formation particulates. Further, it is believed, that the reactivity of the surface modifying treatment agent with formation surfaces or portions of formation surfaces creates an aggregation or agglomeration of the hydrophobic tail in near proximity to the formation surface. The use of the surface modifying treatment agents as a means to consolidate particulates of the formation is particularly effective in the treatment of shale formations.

The consolidation further provides stability to the formation since aggregated particulates allow fluid to flow back through the pumped fluids without flowing formation solids back to the surface. This phenomenon is attributable to the anchoring of the metal of the surface modifying treatment agent onto the surface formation and to the alignment of the tail of the treatment agent enabling limited contact-time of the fluid with formation surface.

In another embodiment, the swelling, dispersement, disintegration, migration and otherwise disruption of clay in oil and gas producing formations may be decreased by use of the surface modifying treatment agent and native fluid production may dislodge fines in a pore throat. The degree of swelling, as well as migration of clay particles, is often increased when formation clays are disturbed by foreign substances, such as aqueous well treatment fluids. Like fines formation, the swelling and migration of formation clays presents problems during stimulation and well completion, such as by increasing the bulk volume of treatment fluids. For instance, clays, in the presence of well treatment fluids, often expand and may be disrupted by becoming unconsolidated, thereby producing particles which migrate into a borehole. The presence of the hydrophobic tail on the surface modifying treatment agent prevents the swelling and migration of formation clay particles. Thus, by obstruction of formation capillaries, swelling and migration of formation clay may be reduced or prevented by the use of the surface modifying treatment agent disclosed herein. Loss of formation permeability is thus minimized to create little, if any, reduction in the flow rate of hydrocarbons.

In a preferred embodiment, the surface modifying treatment agent is used in the treatment of a shale formation or a clay-rich formation in order to coat the surface of the formation to reduce water absorption or imbibement of water in order to reduce swelling.

The presence of the hydrophobic tail of the surface modifying treatment agent impedes the permeability of water in water saturated zones of a producing formation without reducing relative permeability to oil or gas. Since relative permeability is dependent on the pore structure and size, wettability of the formation surface and capillary pressure of the water within the formation, in some instances, such as where the formation is characterized by larger pores, water and oil permeability may be improved. With small pore surfaces, the hydrophobic tail of the surface modifying treatment agent attached indirectly to the mineral surface of the formation through the anchor is relatively non-damaging to oil permeability. For example, it is particularly effective in oil saturated sandstone formations while exhibiting the ability to decrease water permeability substantially in water saturated zones.

The surface modifying treatment agents disclosed herein may also be used in the treatment of rich gas or retrograde condensate gas reservoirs and thus presents value to retrograde gas fields by increasing condensate production. In such reservoirs, heavy end fraction of gases may be precipitated in liquid form from solution in the gas as the reservoir pressure within the well is decreased below the dew point of the gas. Condensed liquid drains downward by gravity when its saturation exceeds the irreducible condensate saturation. With retrograde gases, liquids cannot be reabsorbed into the gas phase even if pressure is increased by a rate reduction. When a well treatment fluid containing the surface modifying treatment agent disclosed herein is pumped into a retrograde gas well, the permeability of the formation may be maintained, and condensate dropout minimized. Thus, in turn, minimizes the possibility of the formation of an emulsion between precipitated hydrocarbons and the invading water from the aqueous based well treatment fluid. The pressure below the dew point of the hydrocarbons may therefore be maintained. By enhancing the permeability of the formation to liquid hydrocarbons, loss of light condensate liquids is minimized and light condensate liquids may therefore be more readily displaced.

The surface modifying treatment agents disclosed herein may also be used to enhance load recovery of water. The presence of the hydrophobic tail on the surface modifying treatment agent provides increased recovery of flowback water from the well after fracturing fluid has been returned to the surface. In some instances, flowback water may be as low as 25%, while in some cases, can be as high as 75%, of the volume of fluid that was injected into the well. This application is particularly useful in shale fractures having a complex of narrow fractures with limited conductivity where a low range of fluid recovery values (30% or less) are typically experienced. This lack of recovery is often interpreted as causing formation damage (from residual polymer gels residues), resulting in lowered gas/oil production. Methods as described in this disclosure that results in increased water recovered from the shale-type formation can thus be interpreted to reduce formation damage, and hence improve well productivity. For instance, in a typical fracturing job on a Marcellus shale formation, 20,000 to 150,000 barrels of fracturing fluid may be pumped into the well, depending upon the number of stages pumped.

The hydrophobic nature of the surface modifying treatment agent may further serve to control water condensation in the pores of a near wellbore region of a permeable formation. Often, the liquid zone formed from the condensation of hydrocarbons within a gas reservoir close to the wellbore hampers gas flow, reducing the productivity of the well the formation of "water block" or "water bank" zones. Condensation of water in the pores of a near wellbore region of a permeable formation may be decreased by the presence of the surface modifying treatment agent. Fluid transfer and water flux through the pores of the near wellbore region of the formation may be controlled by inhibiting the formation of a water bank by the hydrophobic tail of the surface modifying treatment agent.

The surface modifying treatment agent may further be used to enhance the productivity of injection wells in a water flood operation. Field water or field brine pumped through one or more injection wells drilled into the formation causes displacement of oil within the formation and improvement in hydrocarbon recovery. In an embodiment, one or more injection wells may be spaced apart from each other and perforated so as to be able to direct the injection fluid containing the surface modifying treatment agent in the direction of one or more producing wells and into the hydrocarbon-bearing formation. The presence of the hydrocarbon tail on the surface modifying treatment agent enhances direction of water flow within the matrix of the subterranean formation. As the injection fluid is pumped into the formation, the surface modifying treatment agent in the well treatment fluid cause the water to be redirected through the formation. In so doing, hydrocarbons are displaced toward the producing well or wells. Thereafter, hydrocarbons will be produced from the producing well to the surface.

The surface modifying treatment agent disclosed herein may further be used in the treatment of tar sand formations. Conventional recovery of hydrocarbons from heavy oil deposits within the tar sand is generally accomplished by steam injection to lower the viscosity of the crude to the point where it can be pushed toward the production wells. The heavy oil is immobile at reservoir temperatures and therefore the oil is typically heated to reduce its viscosity and mobilize the oil flow. The surface modifying treatment agent enhances oil flow and thus recovery of oil from tar sand by minimizing the flow of water into the deposits. The hydrophobicity of the surface modifying treatment agent further minimizes the interference of steam in the removal of oil from tar sand deposits.

In another embodiment, the surface modifying treatment agent is used in an acidizing operation in order to increase the penetration of acid into the formation. Since the hydrocarbon tail of the surface modifying treatment agent is either on or in close proximity to the formation face, reaction of acid with the formation surface is retarded. The reactive acid may therefore etch the formation in more distant areas from the port of entry of the treatment fluid. Deeper acid penetration in the well may therefore result.

Further, the surface modifying treatment agent may be used to shut-off water into a formation. In this regard, the surface modifying treatment agent finds particular applicability in the treatment of matrix formations having finer grained particles between larger rock particles or finer grained particles in which the larger particles are embedded. The hydrophobic tail on the surface modifying treatment agent reduces the influx of water into matrix formations characterized by low permeability. Further, matrix formations produce a large amount of water due to an influx of water into the wellbore. Over time, the amount or percentage of produced water may increase resulting in a corresponding decrease in the production of desired hydrocarbons, eventually rendering further production of hydrocarbons from the well uneconomical. The hydrocarbon tail indirectly attached to the formation blocks the flow of water into the formation or otherwise abates the influx of water. This results in increased rates in hydrocarbon production and ultimately increases recoverable reserves.

In an embodiment, the surface modifying treatment agent may function as a passive anti-microbial agent in order to counter bacterial growth principally caused by nitrogen and/or phosphorus in formation water or within fluid injected into the formation. The hydrocarbon tail of the surface modifying treatment agent repels the fluid from the formation and thus decreases contact time of the fluid in the formation. This prevents the build-up of aerobic bacteria, anaerobic bacteria and other microbials.

In another embodiment, the surface modifying treatment agent may be used to passively inhibit, control, prevent or remove scale deposition onto or within the formation. The hydrophobic tail of the surface modifying treatment agent minimizes or decreases the ability of such materials to adhere to the formation. This may be attributable to the hydrophobic nature of such minerals scales as calcium, barium, magnesium salts and the like including barium sulfate, calcium sulfate, and calcium carbonate scales. The composites may further have applicability in the treatment of other inorganic scales, such as metal sulfide scales, like zinc sulfide, iron sulfide, etc. Since such scales tend to plug the pore spaces and reduce the porosity and permeability of the formation, the surface modifying treatment agent described herein improves the permeability of the formation.

When coated onto the substrate of the formation being treatment, the bulky nature of the hydrocarbon tail of the surface modifying treatment agent prevents or controls deposition of organic particulates onto the formation substrate, fines are returned to the surface with the fluid. In addition, bonding of the metal of the surface modifying treatment agent onto the formation minimizes binding sites for such organic particulates. Thus, the surface modifying treatment agents may be used to control or prevent the deposition of organic materials (such as paraffins and/or asphaltenes) within or onto the formation. Such solids and particulates are known to negatively impact the overall efficiency of completion of wells and, like scale inhibitors, can precipitate from produced water and create blockages in flow paths within the formation. The formation and deposition of such unwanted contaminants decrease permeability of the subterranean formation, reduce well productivity, and, in some cases, may completely block well tubing.

The surface modifying treatment agent may further be introduced into a non-hydrocarbon producing well in order to dispose of salt water. This application may be used in those instances where water flooding operations are not in use. In this operation, the salt water may be disposed of by injecting the water into permeable low pressure strata below the fresh water level in a salt water disposal well.

The bonding of a surface modifying treatment agent onto a subterranean formation may be enhanced by first pre-treating the formation. In the pre-treatment, an aqueous fluid is first pumped into the well which penetrates the formation. The aqueous fluid preferably contains an organic acid such as a weak organic acid, like acetic acid, formic acid, citric acid, oxalic acid, malonic acid, succinic acid, malic acid, tartaric acid, phthalic acid ethylenediaminetetraacetic acid (EDTA), nitrilotriacetic acid, glycolic acid, N-hydroxyethyl-N,N',N'-ethylenediaminetriacetic acid, hydroxyethylimino-diacetic acid, diethylenetriaminepentaacetic acid, cyclohexylenediaminetetraacetic acid or a mixture thereof. In such instances, the amount of organic acid in the aqueous fluid is typically between from about 0.5 to about 25 volume percent.

The aqueous well treatment fluid containing the surface modifying treatment agent is then pumped into the well. The access to the sites for the surface modifying treatment agent to bind onto the surface of the subterranean formation is facilitated by pre-treatment of the subterranean formation with the aqueous fluid.

One or more stages of aqueous fluids may be pumped into the well prior to pumping of the aqueous well treatment containing the surface modifying treatment agent. Where more than one stage of aqueous fluid is pumped into the well prior to pumping of the aqueous well treatment fluid containing the surface modifying treatment agent, each stage may contain the same organic acid or a different organic acid. Thus, for example, the first and second stages of aqueous fluids pumped into the well may both contain acetic acid or the first stage may contain acetic acid and the second stage tartaric acid. Where more than two stages of aqueous fluids are pumped into the well prior to pumping of the aqueous well treatment fluid containing the surface modifying treatment agent, more than one or all of the stages may contain the same organic acid or each stage may contain a different organic acid and so on.

Prior to pumping the aqueous fluid into the well or in between pumping of different stages of aqueous fluids into the well, the surface of the formation may be further treated with an alkaline solution such as sodium hydroxide or potassium hydroxide.

Where the formation is treated with a salt solution, the formation is preferably treated with one or more subsequent stages of aqueous fluid prior to pumping of the surface modifying treatment agent into the well. The pumping of an alkaline solution into the well may be especially desirable in those formations composed of metal oxides in order to regenerate the binding sites for the surface modifying treatment agent onto the formation.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Berea sandstone cores measuring 1.0" in diameter and 1.5" in length and having nitrogen permeability of 200 and were evacuated with air and then saturated with either 2% aqueous solution of potassium chloride (KCl) or ISOPAR™ paraffinic fluid of ExxonMobil Chemical Company. The core was then installed in a hydrostatic core holder apparatus. Approximately 200 psi back pressure was applied at the exit end and approximately 1,000 psi confining stress (overburden pressure) was applied around the entire cylinder. The confining stress pressure simulated stress in the downhole formation. When saturated with KCl, a flow of the paraffinic fluid was flowed through the core in order to establish a base line permeability to the core to the oil followed by a flow of KCl solution to establish a baseline permeability to water. When saturated with the paraffinic fluid, a flow of the KCl solution was flowed through the core in order to establish a base line permeability to the core to the water followed by a flow of paraffinic fluid to establish a baseline permeability to oil. Pressure drop was measured across the entire length of the core and was used to calculate individual baseline permeability to water and to oil.

Example 2

A five pore volume of a neat fluid of AL-B, 2% of an organophosphonate having a hydrocarbon polymeric hydrophobic tail in an organic solvent blend, commercially available from Aculon, Inc., was then injected into the core and allowed to soak for about one hour. After treatment, oil is flowed first and a comparison of permeability to oil right after treatment versus permeability to oil before treatment was made. After oil, water was flowed measuring permeability of water at residual oil after treatment and this was compared to the water right before treatment. As such, the oil at irreducible water saturation and the water at residual oil saturation were measured and the percent retention in permeability was then determined.

Figure 4:
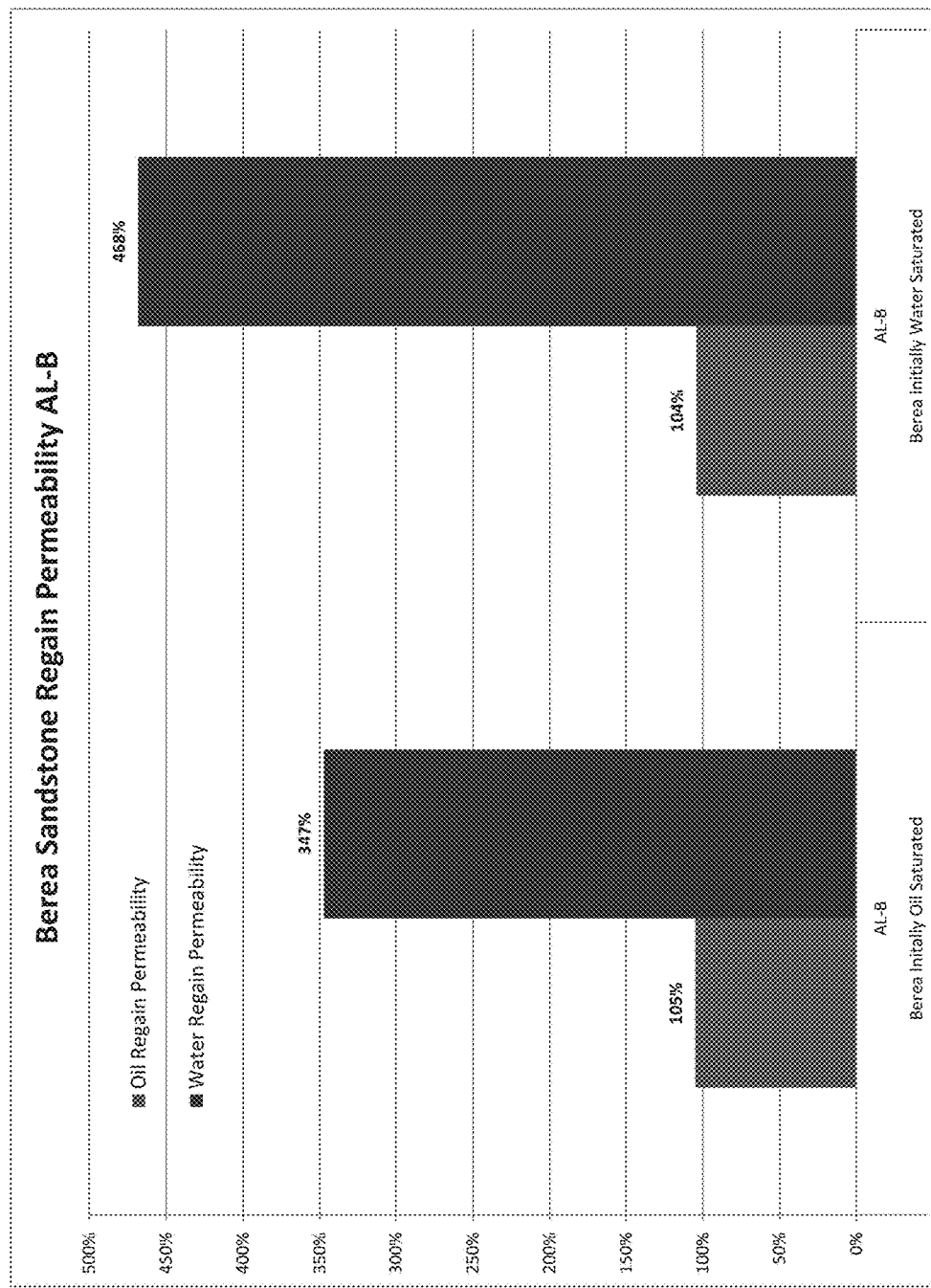
FIG. 4 illustrates regain permeability in a Berea core by use of a surface modifying treatment agent having a hydrophobic tail and an anchor of an organophosphorus acid derivative.

FIG. 4 illustrates the percent regain of the testing. While water regain permeability was very high (in excess of 300% and 468%), oil regain permeability was slightly exceeded 100% both Berea samples. FIG. 4 establishes that treatment of the core with an organophosphonate treatment agent containing a hydrophobic tail provides an improved rate of return of fluids from the well. The data demonstrates that the organophosphonate treatment agent stabilizes fine movement since decreased permeability would be noted if movement of fines existed. Further, FIG. 4 illustrates that use of the organophosphonate treatment agent would reduce solids flowback to the surface in light of the increase in permeability. Further, the lack of reduced permeability evidences minimal clay swelling. Further, the ability to readily produce water by use of the organophosphonate treatment agent provides for minimal residence time for microbes, scales as well as organic deposits such as asphaltenes. The increase in the capacity of the reservoir to transmit to transmit hydrocarbons illustrates enhancement in recovery of hydrocarbons from deposits within tar sands. Further, the hydrophobic coating of the formation with the organophosphonate further provides for inhibition in the reactivity of acid such that deeper penetration of acid into the formation is possible.

Example 3

Permeability testing was performed on a synthetic core composed of 20-40 mesh gravel, 100 mesh sand and 325 mesh silica. The 325 mesh silica mimics fines in formations. The synthetic core was 1.0" in diameter and 2.0" in length and having nitrogen permeability of 100 and was saturated with 2% aqueous solution of potassium chloride (KCl). The core was then installed in a hydrostatic core holder apparatus. Approximately 200 psi back pressure was applied at the exit end and approximately 1,000 psi confining stress (overburden pressure) was applied around the entire cylinder. The confining stress pressure simulated stress in the downhole formation. ISOPAR™ paraffinic fluid was then flowed through the core in order to establish a base line permeability to the core to the oil. When saturated with the paraffinic fluid, a flow of the KCl solution was flowed through the core. Pressure drop was measured across the entire length of the core and was used to calculate individual baseline permeability to water and to oil.

A five pore volume of a neat fluid of AL-B was then injected into the core and allowed to soak for about one hour. After treatment, paraffinic fluid was flowed through the core and permeability of oil at irreducible water saturation was then measured and the percent retention in permeability was then determined. After oil, water was flowed measuring permeability of water at residual oil after treatment and this was compared to the water right before treatment. As such, the oil at irreducible water saturation and the water at residual oil saturation were measured and the percent retention in permeability was then determined.

Figure 5:
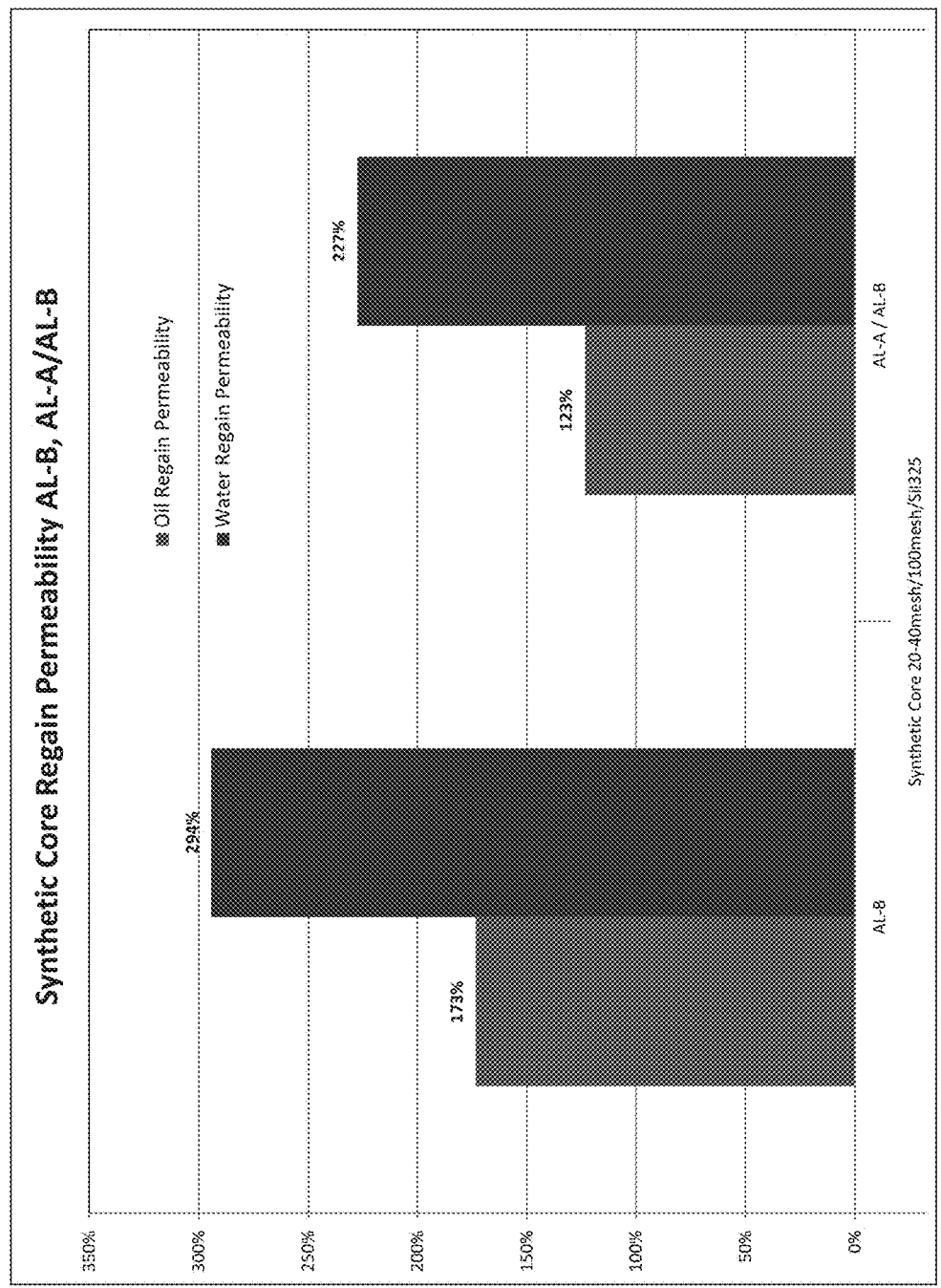
FIG. 5 illustrates retention in permeability in a synthetic core containing 325 mesh silica when using a surface modifying treatment agent having a hydrophobic tail and an anchor of an organophosphorus acid derivative.

The data is illustrated in FIG. 5 wherein the lack of reduction in permeability demonstrates the lack of fines movement.

Example 4

The effect of surface modifying treatment agents on water and hydrocarbons was determined for three substrates. Each of the surface modifying treatment agents had a hydrophobic tail and an anchor. The anchor through a covalent bond secures the surface modifying treatment agent onto the surface of the substrate. The surface modifying treatment agents were H1-F and Aculon E [comprising 2% of a treatment agent having a transition metal (anchor) linked to a fluorinated hydrocarbon tail in an organic solvent] and AL-B [comprising 2% of an organophosphonate (anchor) having a hydrocarbon polymeric hydrophobic tail in an organic solvent blend]; all commercially available from Aculon, Inc. Aculon-E and AL-B exhibited hydrophobic and oleophobic properties while H1-F exhibited hydrophobic properties only.

The surface modifying treatment agent was sprayed onto a glass slide (having a more homogeneous surface than natural rock), a core of Ohio sandstone and a core of Berea sandstone to provide a coating approximately 1 to 10 nm thick. The cores of Ohio sandstone and Berea sandstone were approximately 1.0" in diameter and 1.5" in length. The anchor of the surface modifying treatment agent reacted with oxides on the surface of the substrate. As a result, the surface modifying treatment agent was covalently bonded onto the surface of the substrate. The samples were then kept in an oven at 150 F until completely dry to remove the solvent. After being modified, all of the substrate surfaces were hydrophobic. Contact angle and sliding (or roll-off) angle were then determined and used as the primary measure of performance. The contact angle demonstrates wettability characteristics of the surface while the sliding angle and contact angle hysteresis characterized the ease of fluid roll off from the substrate.

Glass Slide.

Table I show the contact angles obtained with both water and ISOPAR-L™ paraffinic fluid (Isopar-L simulated oil). As demonstrated, AL-B was the most oleophobic and the amount of hydrophobicity imparted by each of the three surface modifying treatment agents was about the same. Glass treated with Aculon E had a sliding angle of 20°, while modified surfaces using H1-F and AL-B exhibited a large contact angle hysteresis with water. Drops of fluids stayed pinned on the surface even at a 90° rotation angle. The sliding angle using Isopar-L was 8 to 10° when H1-F was used as the surface modifying treatment agent, 30° for AL-B and little roll off for Aculon E. In this last case, the hysteresis between advancing (liquid drop front) and receding (rear end) angles was large and the drop stay pinned on the surface of the modified glass. The wettability behavior is set forth in Table I and demonstrates Aculon-E to be more effective as surface modifying treatment agent to move water while H1-F was more effective in the flow of oil.

TABLE I

| Surface Modifier | Contact Angle (Water) | Contact Angle (IsoparL) |
| --- | --- | --- |
| None | 36 | Wetting state |
| H1-F | 95 | 10 |
| E | 83 | 48 |
| AL-B | 97 | 58 |

Ohio Sandstone.

The contact angle and sliding angle measurements for Ohio sandstone are demonstrated in Table II below:

TABLE II

| Surface Modifier | Fluid | Surface Energy (mJ/m$^2$) | Work of Adhesion (mJ/m$^2$) | Sliding Angle (°) |
| --- | --- | --- | --- | --- |
| H1-F | Water | 1.67 ± 0.01 | 11.10 ± 0.01 | Pinning effect |
| H1-F | IsoparL | NA | NA | Goes through* |
| E | Water | extremely low, cannot be calculated | 7.81 ± 0.01 | 17-20 |
| E | IsoparL | 28.12 ± 0.02 | 58.20 ± 0.03 | Goes through** |
| AL-B | Water | 1.67 ± 0.01 | 11.10 ± 0.01 | Pinning effect |
| AL-B | IsoparL | 12.49 ± 0.04 | 37.34 ± 0.06 | Goes through*** |

*surface modified glass had a very low sliding angle (7-10)
**IsoparL drop stayed pinned on E modified glass
***roll-off angle of IsoparL on AL-B modified glass was 30°

In the case of Aculon H1-F and AL-B, the contact angle was 147° and the surface energy was 1.67 mJ/m². However, hysteresis between advancing and receding angles in the range of 20 to 40° leading to a pinning effect and retention of the water drop even where the sample was rotated at 90°. Adsorption studies also demonstrated that when the sandstone was treated, water did not flow through the stone. After 30 minutes the water drop was still on surface of the modified sandstone, while for control Ohio Sandstone the water passed through instantaneously. When Aculon E was used as the surface modifying treatment agent, the water contact angle with the surface of the rock was 153°. The surface energy was very low. In this case, the interaction between the support and water was less than that of the dispensing pipette tip and water. The drop had to be big enough so that its weight allowed it to be removed from the pipette tip. In this case, a sliding angle of 17-20° was observed. As the sample was left flat, water flowed more easily off the surface of the rock with increase in drop size. No adsorption of the water drop was left on the surface of the rock.

Oleophobicity of the surface treated with the surface modifying treatment agent was determined with Isopar-L. When the surface modifying treatment agent was H1-F, Isopar-L was observed to go through the surface instantaneously. The contact angle with AL-B modified sandstone was 60°. The adsorption through the sandstone core was slower than in the case of H1-F but the core was observed to be very permeable to Isopar-L. The surface properties of modified sandstones are presented in Table II. (The surface energy and work of adhesion represent how easy it is to remove a drop of the fluid perpendicular to the surfaces while the sliding angle represents the ease of moving the fluid tangentially to the surface and represents the movement of the fluid through a porous media.) The data shows similar conclusions as observed with modified glass slides, i.e., the movement of water was easier when the surface modifying treatment agent was Aculon E while H1-F provided a better flow of hydrocarbons (due to low surface energy of the surface). It is likely that a reduction in the roughness of the surfaces contributes to a decrease in drag and improved flow of hydrocarbon.

TABLE III

| Surface Modifier | Fluid | Surface Energy (mJ/m²) | Work of Adhesion (mJ/m²) | Sliding Angle (°) |
|---|---|---|---|---|
| H1-F | Water | 1.67 ± 0.01 | 11.10 ± 0.01 | Pinning effect |
| H1-F | IsoparL | NA | NA | Goes through* |
| E | Water | extremely low, cannot be calculated | 7.81 ± 0.01 | 17-20 |
| E | IsoparL | 28.12 ± 0.02 | 58.20 ± 0.03 | Goes through** |
| AL-B | Water | 1.67 ± 0.01 | 11.10 ± 0.01 | Pinning effect |
| | IsoparL | 12.49 ± 0.04 | 37.34 ± 0.06 | Goes through*** |

*surface modified glass had a very low roll-off angle (7-10°)
**Isopar-L drop stayed pinned on E modified glass
***sliding angle of Isopar-L on AL-B modified glass was 30°

Berea Sandstone.

Berea sandstone showed the same hydrophobic behavior as the Ohio Sandstone. No contact angle could be measured using Isopar-L. For oil, the absorption was very quick. Absorption of AL-B was a little slower than H1-F. The hydrophobic properties and surface energy results are presented in Table IV where it is illustrated that surfaces modified with Al-B and H1-F exhibited low surface energy.

TABLE IV

| Surface Modifier | Average Contact Angle | Surface Energy | Work of Adhesion (mJ/m²) |
|---|---|---|---|
| H1-F | 122.83 | 10.15 | 33.33 |
| AL-B | 143.11 | 2.5 | 14.58 |

As illustrated in Tables I, II, III and IV, substrate surfaces modified with the described surface modifying treatment agents provide for improved flow of produced hydrocarbons.

Example 5

Longevity studies were undertaken using glass slides and modified glass slides kept in brine (2% KCl, 11.6 ppg $CaCl_2$, 19.2 ppg $ZnBr_2$, 12.5 ppg NaBr, 13 ppg $CaBr_2/CaCl_2$) for five months and sandstone kept in produced water for one month. Atomic Force Microscopy (AFM) was used to determine the smoothness of the surfaces. Several glasses slides were kept in the same fluid and every month one slide was removed and analyzed. The slide was then washed with deionized water and dried and then tested for hydrophobicity. Surfaces modified with H1-F and Aculon E demonstrated good stability in brine after five months. In the case of AL-B, a decrease in the contact angle through time was observed. In the five-month period, the sliding angle for the H1-F modified substrate decreased up to 4°.

Example 6

An effective method for depositing self-assembled monolayers from a surface modifying treatment agent onto an oxide surface was first determined. The surface modifying treatment agent had a hydrophobic tail and an anchoring site. The anchoring site through a covalent bond secured the surface modifying treatment agent onto the surface of the substrate. The surface modifying treatment agent exhibited hydrophobic properties and was commercially available from Aculon, Inc. as H1-F [comprising 2% of a treatment agent having a transition metal (anchor) linked to a fluorinated hydrocarbon tail in an organic solvent]. In the first test, Test A, a clean and dry glass slide was directly modified with the monolayer by spraying the surface of the slide with H1-F. In the second test, Test B, the surface of a glass slide was wet with a thin film of water. H1-F was then applied onto the coating. In the third test, Test C, the surface of the glass slide was wet with a thin film of ISOPAR-L™ paraffinic fluid, a product of ExxonMobil Chemical Company. The ISOPAR-L simulated oil wet reservoirs. H1-F was then applied onto the slide.

After applying the nanocoating, each of the samples was then left for about five minutes for the reaction to occur on the surfaces. The surface was then dried. A drop of water was then put onto the surface. If the drop spread on the surface then the quality of the bonding was concluded to be unacceptable. If the sample demonstrated hydrophobicity, then the coating was concluded to be successful. Test A demonstrated hydrophobicity while Test B and Text C did not. It was concluded that the glass slides were not modified successfully and did not enhance the ability of the surface modifying treatment agent to adhere onto the surface.

When Test B was repeated and the slide was kept exposed to air for a period of time in order for complete evaporation of the liquid to occur. HF-1 was then applied to the glass slide. The surface modified glass was then noted to exhibit hydrophobicity. No interaction of the oily surface of Test C was observed. It was concluded that binding efficiency of the monolayer would be very low when the surface of the rock being treated was exposed to oil or a large amount of water. It was further concluded that the surface of the rock being treated would need to be dry and clean from organic material as well as other contaminants in order for the surface modifying treatment agent to have the best access to the binding site of the rock.

Example 7

Two Berea sandstone cores measuring 1.0" in diameter and 1.5" in length were used. The first core had a nitrogen permeability of 804 md and the second core had a nitrogen permeability of 773 md. Both of the cores exhibited a porosity of about 20%. Both of the cores were evacuated with air and then saturated with either 2% aqueous solution of potassium chloride (KCl) or ISOPAR™ paraffinic fluid. The cores were then installed in a hydrostatic core holder apparatus. Approximately 200 psi back pressure was applied at the exit end and approximately 1,000 psi confining stress (overburden pressure) was applied around the entire cylinder. The confining stress pressure simulated stress in the downhole formation.

The first core was not subjected to a preflush but was saturated in oil. Initial permeability to oil and water was determined in the production direction. First the permeability to water at residual oil was determined by flowing water through the core until differential pressure was stabilized. Oil was then flowed through the core and the permeability to oil was determined until there was irreducible water at stable differential pressure. The core was then treated with a surface modifying treatment agent exhibiting both hydrophobic and oleophobic properties and commercially available from Aculon, Inc. as Aculon-E [comprising 2% of a treatment agent having a transition metal (anchor) linked to a fluorinated hydrocarbon tail in an organic solvent] in the injection direction. Finally, permeability to oil and water was re-established in the production direction. Both permeability to water and oil cycles were repeated and determined. Then % regain permeability was calculated.

The second core was preflushed by saturating it in 2% KCl. Initial permeability to oil and water was determined in the production direction. Permeability to water at residual oil was first determined by flowing water through the core until differential pressure was stabilized. Oil was then flowed through the core until irreducible water was established at stable differential pressure. Permeability was then determined. This was followed by an injection of 10 pore volume of methanol as the pre-flush flowed through the core. The sample was then treated with the Aculon-E in the injection direction. Permeability to oil and water was then re-established in the production direction. Both permeability to water and oil cycles were repeated and determined. The % regain permeability was then calculated.

Figure 6:
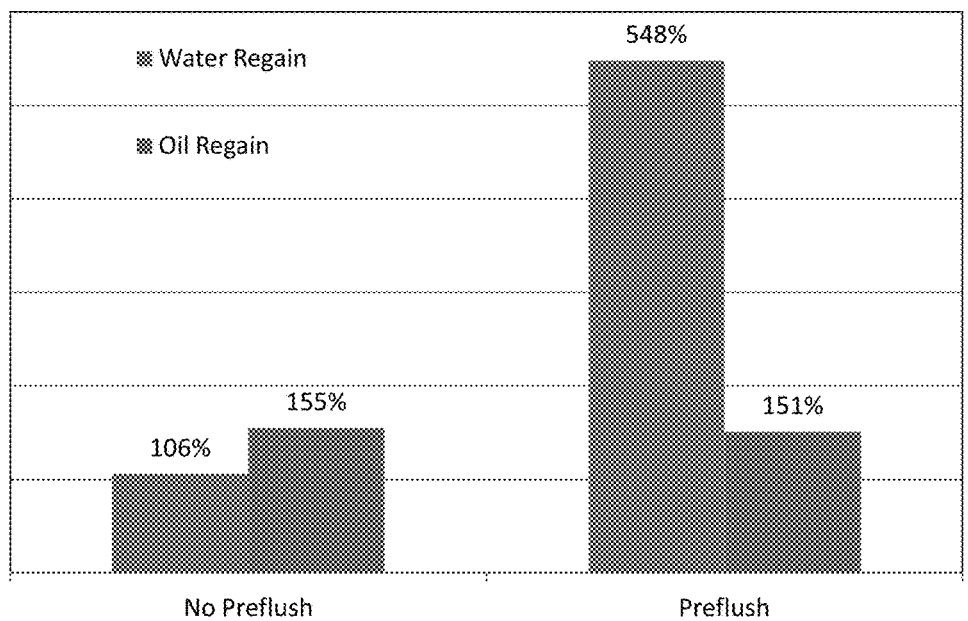
FIG. 6 illustrates the effect of pre-treatment on regain permeability in a Berea core by use of a surface modifying treatment agent having a hydrophobic tail and an anchor of an organophosphorus acid derivative.

FIG. 6 shows the results obtained for regain permeability. As illustrated, the water regain increased from 106% for the first core (no pre-flush) to 548% for the second core (pre-flush). This demonstrates better efficiency for bonding of the surface modifying treatment agent when the core is pre-flushed. The regain to oil remained essentially similar with or without pre-flush.

In separate cores, a five pore volume of neat fluids of H1-F and Aculon E, 2% of treatment agents in an organic solvent, the treatment agents having a transition metal linked to a fluorinated hydrocarbon tail, and AL-A, 2% treatment agent in an organic solvent having a transition metal linked to a hydrophobic tail, all commercially available from Aculon, Inc., were then injected into their respective core and allowed to soak for about one hour. After treatment, oil was flowed first and a comparison of permeability to oil right after treatment versus permeability to oil before treatment was made. After oil, water was flowed measuring permeability of water at residual oil after treatment and this was compared to the water right before treatment. As such, the oil at irreducible water saturation and the water at residual oil saturation were measured and the percent retention in permeability was then determined.

Figure 7:
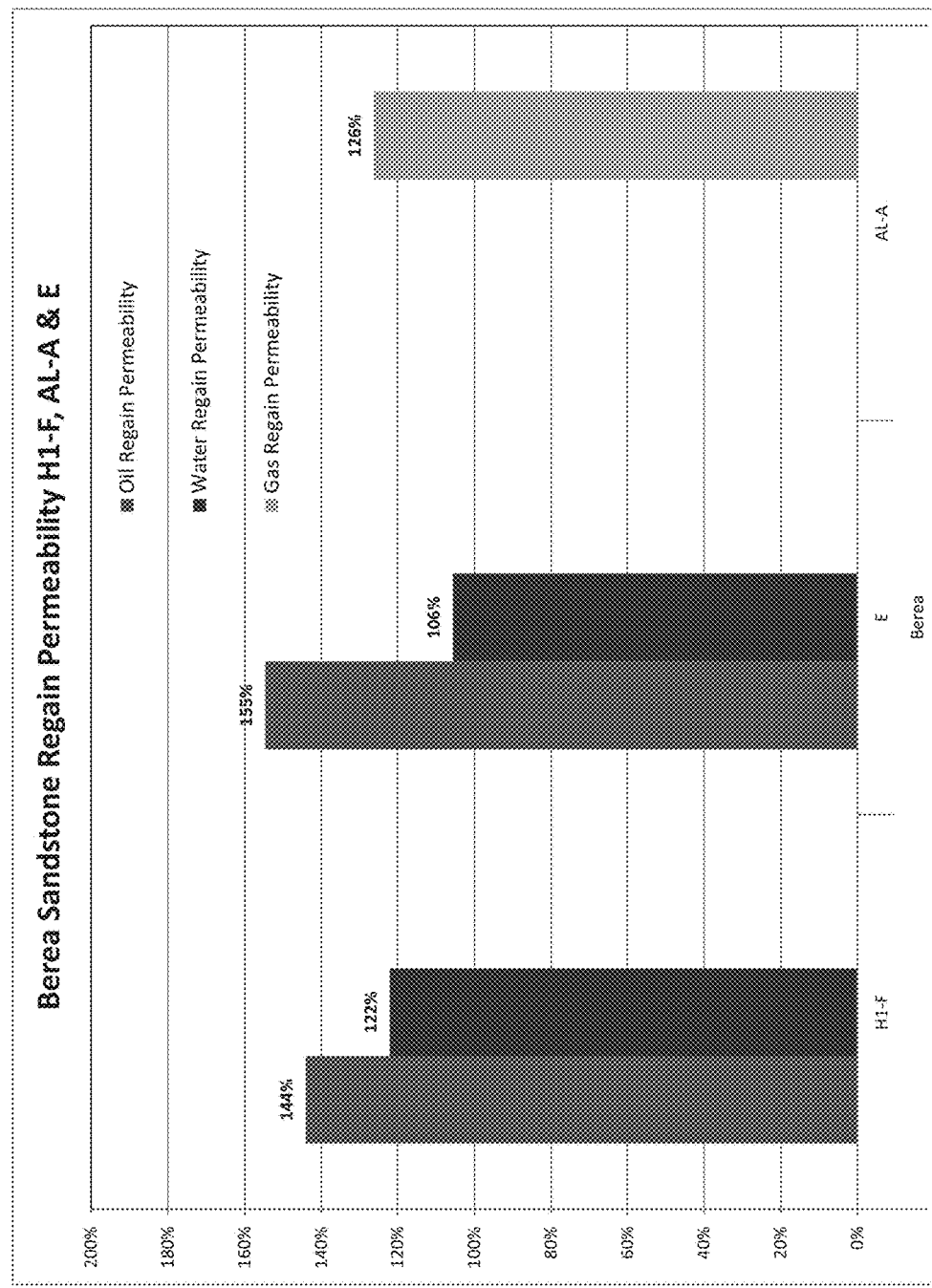
FIG. 7 illustrates regain permeability in a Berea core by use of a surface modifying treatment agent having a metallic anchor and a hydrophobic tail.

FIG. 7 illustrates the percent water regain and oil regain of the testing for H1-F and Aculon E. FIG. 7 illustrates oil regain permeability to be slightly higher than water regain permeability. FIG. 7 also illustrates the percent gas regain for AL-A to be in excess of 100%. FIG. 7 establishes that treatment of the core with a treatment agent having a metal linked to a hydrophobic tail provides an improved rate of return of fluids from the well. The data further demonstrates that the treatment agent stabilizes fine movement since decreased permeability would be noted if movement of fines existed. Further, FIG. 7 illustrates that use of the treatment agent would reduce solids flowback to the surface in light of the increase in permeability. Further, the lack of reduced permeability evidences minimal clay swelling. Further, the ability to readily produce water by use of the treatment agent provides for minimal residence time for microbes, scales as well as organic deposits such as asphaltenes. The increase in the capacity of the reservoir to transmit to transmit hydrocarbons illustrates enhancement in recovery of hydrocarbons from deposits within tar sands. Further, the hydrophobic coating of the formation with the treatment agent further provides for inhibition in the reactivity of acid such that deeper penetration of acid into the formation is possible.

Example 8

About 5 g of clay containing 92 weight % silica (or quartz) and 8 weight % montmorillonite (simulating Wyoming drilling clay) was treated with H1-F fluid described in Example 1 and placed into an oven having a temperature of approximately 150° F. wherein the solvent was evaporated, leaving a coating of the treatment agent onto the clay. Untreated clay was also placed into an oven and heated under the same conditions.

Capillary suction time tests were performed by placing the clay samples onto filter paper within a funnel and pouring water through the funnel. In separate examples, the water contained clay stabilizers—2 vol. % KCl, 1 gpt ClayCare™ and 1 gpt Claytreat 3C™ (ClayCare and Claytreat are products of Baker Hughes Incorporated). In a comparative experiment, fresh water was poured through the funnel. Two electrodes were attached to the filter paper. The amount of time between the water first touching an electrode on the paper and the water reaching a second electrode on the paper was then measured.

Figure 8:
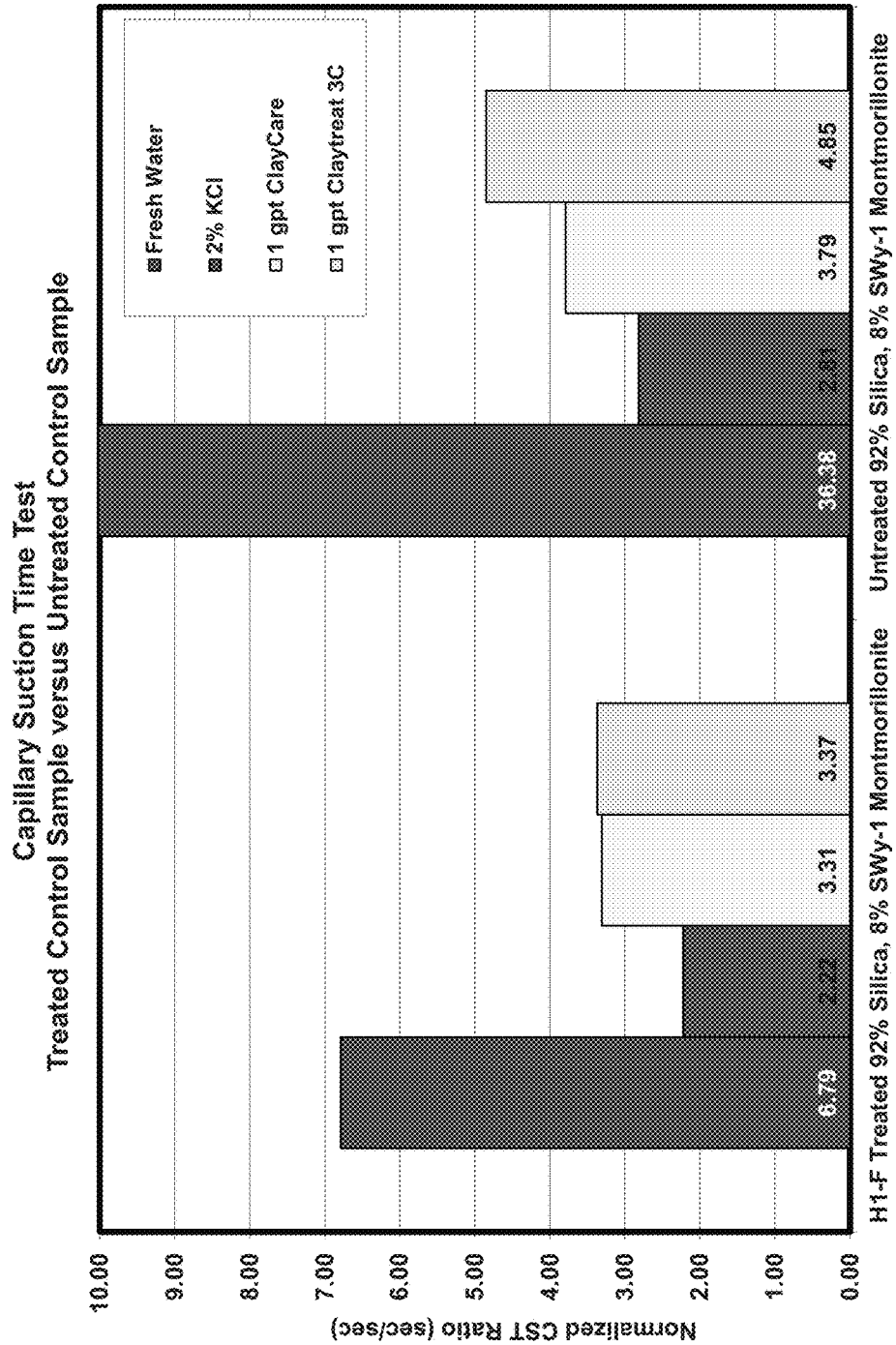
FIG. 8 demonstrates the inhibition in the swelling of clay using a surface modifying treatment agent having a metallic anchor and a hydrophobic tail.

FIG. 8 illustrates the amount of time for fresh water to reach the second electrode as being almost six times less when the sand was treated with H1-F than not treated with H1-F. This time further decreased when the water contained clay stabilizers—KCl, ClayCare and Claytreat 3C. The data demonstrates that clay treated with H1-F inhibits the swelling of clay.

Example 9

Permeability testing was performed on synthetic cores composed of 20-40 mesh gravel, 100 mesh sand and 325 mesh silica. The 325 mesh silica mimics fines in formations. The synthetic cores were 1.0" in diameter and 2.0" in length and having nitrogen permeability of 100 and was saturated with 2% aqueous solution of potassium chloride (KCl). The cores were then installed in a hydrostatic core holder apparatus. Approximately 200 psi back pressure was applied at the exit end and approximately 1,000 psi confining stress (overburden pressure) was applied around the entire cylinder. The confining stress pressure simulates stress in the downhole formation. ISOPAR™ paraffinic fluid was then flowed through the cores in order to establish a base line permeability to the cores to the oil. When saturated with the paraffinic fluid, a flow of the KCl solution was flowed through the cores. Pressure drop was measured across the entire length of the cores and was used to calculate individual baseline permeability to water and to oil.

Into separate cores were injected a five pore volume of a neat fluid of H1-F, Aculon E and AL-A and the fluids were allowed to soak for about one hour. After treatment, paraffinic fluid was flowed through each of the cores and permeability of oil at irreducible water saturation was then measured and the percent retention in permeability was then determined. After oil, water was flowed measuring permeability of water at residual oil after treatment and this was compared to the water right before treatment. As such, the oil at irreducible water saturation and the water at residual oil saturation were measured and the percent retention in permeability was then determined.

Figure 9:
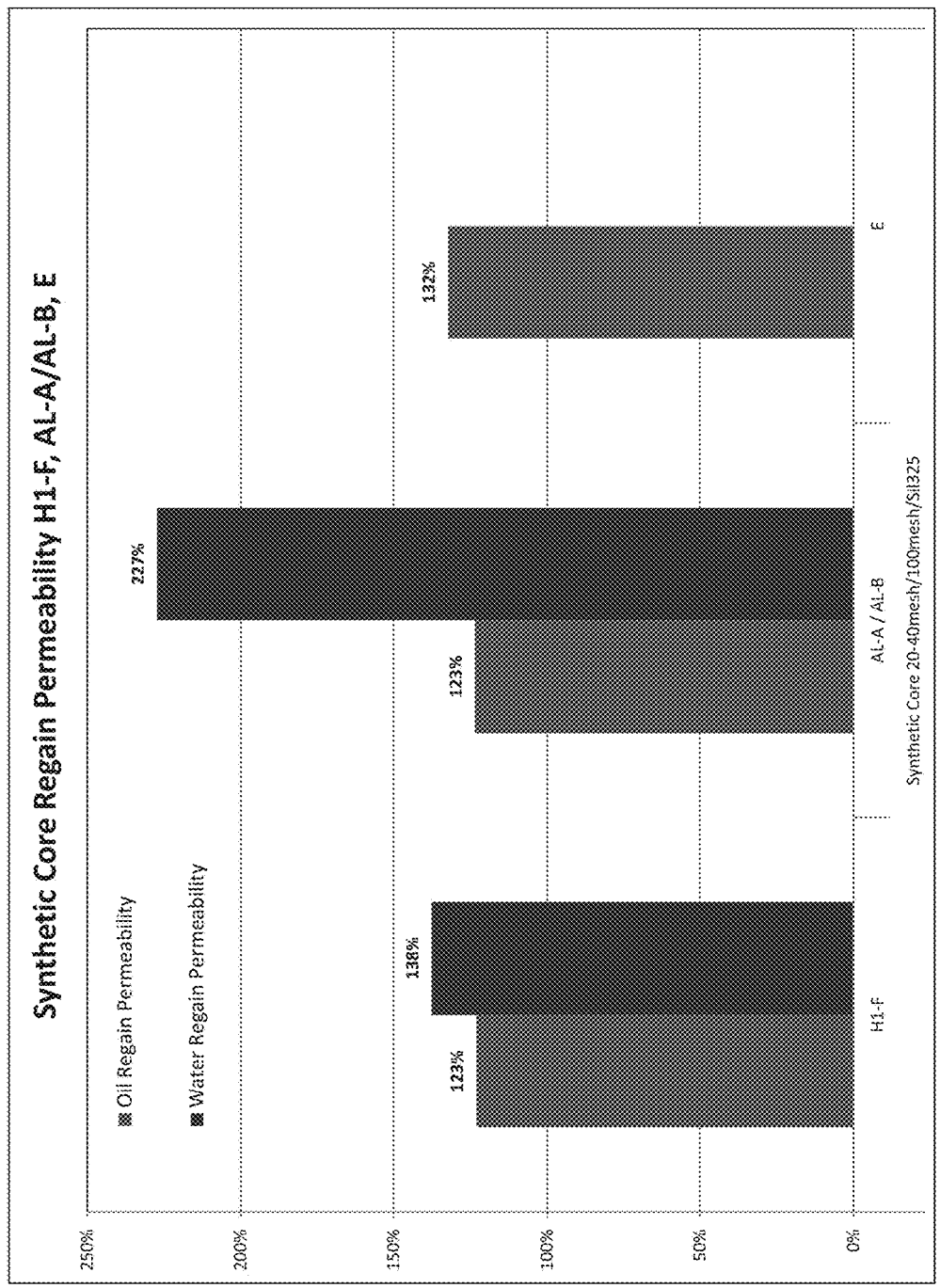
FIG. 9 demonstrates the lack of movement of fines in a synthetic core containing 325 mesh silica when using a surface modifying treatment agent having a metallic anchor and a hydrophobic tail.
Figure 10:
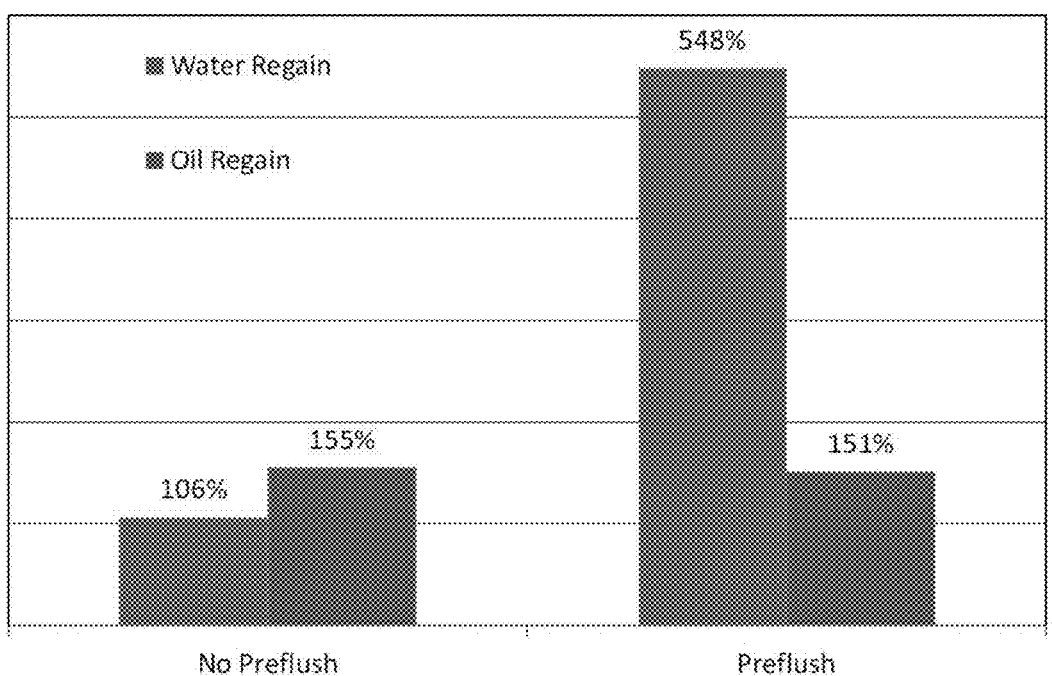
FIG. 10 illustrates the effect of pre-treatment on regain permeability in a Berea core by use of a surface modifying treatment agent having a metallic anchor and a hydrophobic tail.

The data is illustrated in FIG. 9 wherein the lack of reduction in permeability demonstrates the lack of fines movement.

Example 10

This Example illustrates the compatibility of HF-1 with acetic acid. Solutions containing 0.02% (by volume) HF-1 were prepared in the presence 5%, 10% and 15% (by vols.) of acetic acid. Periodically, the HF-1/acetic acid mixtures were applied onto untreated glass slides, and the contact angles of the slides were measured to determine if HF-1 was still active. Acetic acid and HF-1 were seen to be compatible at both room temperature and at 150° F. A contact angle of greater than 40° was still maintained after approximately 8 hours. Further, no precipitation was formed when HF-1 was mixed with acetic acid, immediately or after 24 hours at 75° F. In contrast, a gelatinous precipitate is observed if HF-1 is added to an aqueous solution without acetic acid. The presence of acetic acid kept HF-1 in solution.

Example 11

Figure 11:
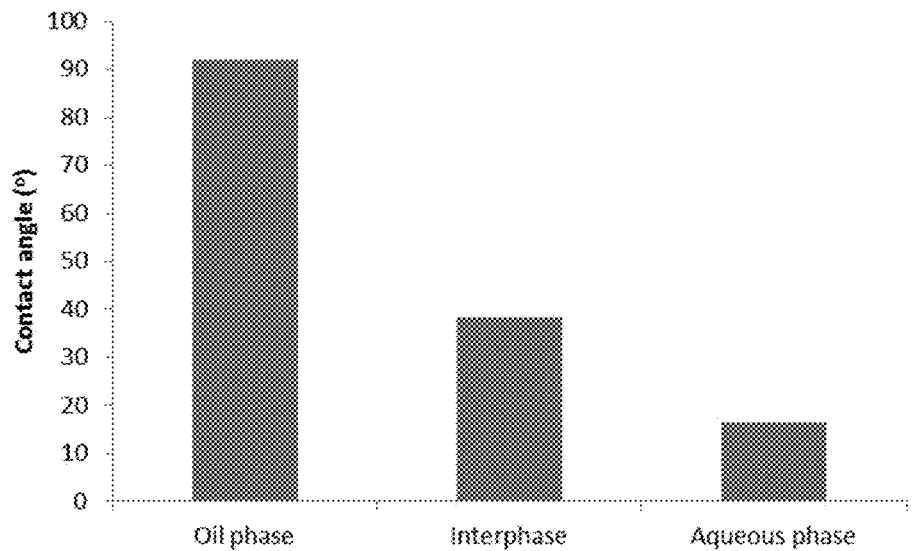
FIGS. 11 and 12 demonstrate the lack of chemical degradation of a surface modifying treatment agent having a metallic anchor and fluorinated hydrophobic tail in an aqueous mixture containing acetic acid.
Figure 12:
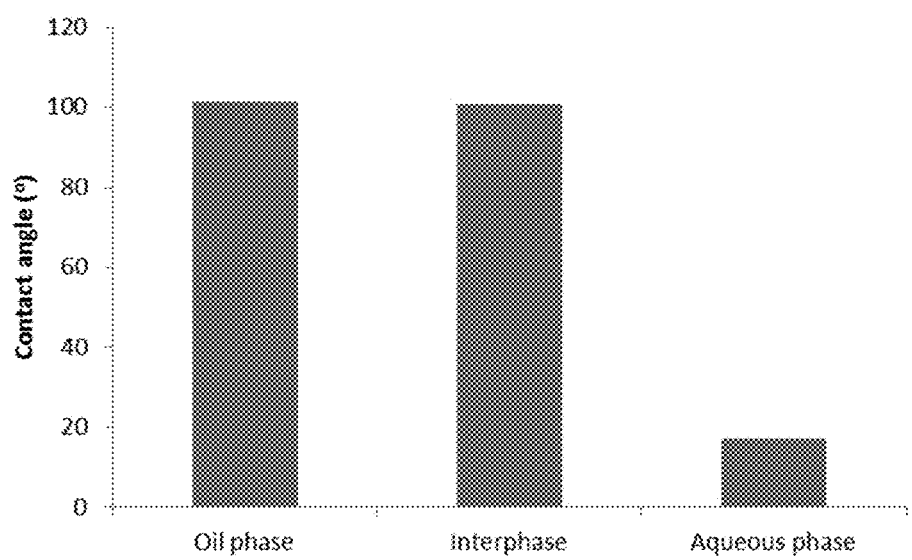

The performance of acetic acid in HF-1 was tested by measuring its contact angle, with an oil contact angle of 100°. Two separate tests were performed and a small volume from each phase within each mixture was applied to the glass slide and the contact angle was measured. For the first test, 45 ml water and 5 ml 2% (by vol.) HF-1 were mixed. For the second test, 5 ml 2% (by vol.) HF-1 was mixed with 45 ml water and 5 ml glacial acetic acid. The contact angle of the glass slide was measured after the oil phase, the interphase and the water phase of the mixture was applied. FIG. 11 and FIG. 12 shows the contact angle for the first and second tests, respectively. HF-1 was seen to be still active after mixing in the oil phase for both cases with the acetic acid solution sample maintaining a higher contact angle, while the baseline sample with only water has lower contact angle indicating chemical degradation. The performance of HF-1 chemically degraded in the interphase for the case with water as well, but not the sample containing acetic acid. This is indicated by a higher contact angle (~100°). The active ingredient is clearly not present in the aqueous phase for both cases.

Example 11

The initial oil permeability, KoSwi, of a carbonate free Berea standstone core plug defined in Example 1 using ISOPAR-L™ paraffinic fluid was determined to be 98.3 mD. A 10 pore volume of a fluid containing 3 gpt H1-F in BioBase 365 (a biodegradable synthetic oil of olefins, available from Shrieve Chemical Products of The Woodlands, Tex.) was injected into the core. The core was then shut-in at 150° F. and the fluid was allowed to soak for about 2 hours. This was followed by introducing into the core 10 pore volumes of a 10% acetic acid solution. ISOPAR-L was then flowed through the core. The final oil permeability was observed to be approximately 138%. This indicates no adverse effect was observed by the acid treatment.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of treating a metal (M) oxide-containing subterranean formation penetrated by a well comprising:
   (a) pumping into the well an aqueous treatment fluid comprising a surface modifying treatment agent and an aqueous media comprising an organic acid wherein the surface modifying treatment agent comprises an anchor and a hydrophobic tail attached to the anchor; and
   (b) binding the surface modifying treatment agent to a surface of a metal (M) oxide-containing subterranean formation by attaching the anchor to the formation.

2. The method of claim 1, wherein the metal oxide-containing formation is a carbonate formation.

3. The method of claim 1, wherein the organic acid of the aqueous media is selected from the group consisting of acetic acid, formic acid, citric acid, oxalic acid, malonic acid, succinic acid, malic acid, tartaric acid, phthalic acid ethylenediaminetetraacetic acid (EDTA), nitrilotriacetic acid, glycolic acid, N-hydroxyethyl-N,N',N'-ethylenediaminetriacetic acid, hydroxyethyliminodiacetic acid, diethylenetriaminepentaacetic acid, cyclohexylenediaminetetraacetic acid and mixtures thereof.

4. The method of claim 3, wherein the organic acid of the aqueous media is selected from the group consisting of acetic acid, formic acid, citric acid and mixtures thereof.

5. The method of claim 1, wherein the anchor is an organophosphorus acid derivative.

6. The method of claim 5, wherein the anchor of the surface modifying treatment agent originates from an organophosphoric acid, organophosphonic acid or an organophosphinic acid.

7. The method of claim 6, wherein the organophosphorus acid derivative is at least one member selected from the group consisting of:
(a) a derivative of a phosphoric acid having the structure $(RO)_x$—P(O)—$(OR')_y$;
(b) a derivative of a phosphonic acid of the structure:

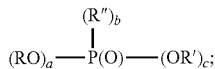

and
(c) a derivative of a phosphinic acid of the structure:

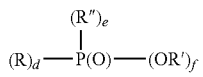

wherein:
R and R" are each independently a radical having a total of 1 to 30 carbon atoms; R' is H, a metal or a lower alkyl having from 1 to 4 carbon atoms;
x is 1 to 2; y is 1 to 2; x+y=3;
a is 0-1;
b is 1;
c is 1-2;
a+b+c is 3;
d is 0-2;
e is 0-2;
f is 1; and
d+e+f.

8. The method of claim 6, wherein the organophosphoric acid, organophosphonic acid or organophosphinic acid is selected from the group consisting of amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, and dodecyl bis-1,12-phosphonic acid.

9. The method of claim 1, wherein the anchor is a metal and the hydrophobic tail is an organo-silicon material, a fluorinated hydrocarbon or both an organo-silicon material and a fluorinated hydrocarbon.

10. The method of claim 9, wherein the fluorinated hydrocarbon is of the structure:

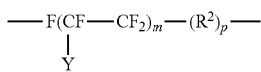

where Y is F or $C_nF_{2n+1}$; m is 4 to 20 and n is 1 to 6; $R^2$ is alkyl containing from 1 to 4 carbon atoms and p is 0 to 18.

11. The method of claim 9, wherein the hydrophobic organo-silicon material has a formula selected from:

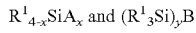

or an organo(poly)siloxane or organo(poly)silazane of the formula:

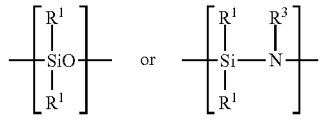

where:
$R^1$ are identical or different and are a hydrocarbon or substituted hydrocarbon radical containing from 1 to 100 carbon atoms;
A is hydrogen, halogen, OH, $OR^2$ or

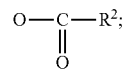

B is $NR^3_{3-y}$;
$R^2$ is a hydrocarbon or substituted hydrocarbon radical containing from 1 to 12 carbon atoms;
$R^3$ is hydrogen or $R^1$;
x is 1, 2 or 3; and
y is 1 or 2.

12. The method of claim 9, wherein the fluorinated hydrocarbon is of the structure:

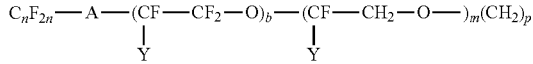

where A is an oxygen radical or a chemical bond; n is 1 to 6, y is F or $C_nF_{2n}$; b is at least 1; m is 0 to 6 and p is 0 to 18.

13. The method of claim 9, wherein the hydrophobic organo-silicon material contains additional units of the formula: $R^5_2SiO_2$ where $R^5$ is halogen.

14. The method of claim 9, wherein the hydrophobic organo-silicon material is an organo(poly)siloxane or an organo(poly)silazane.

15. The method of claim 14, wherein the organo(poly)siloxane or an organo(poly)silazane have units of the formula:

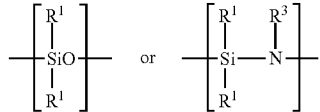

where $R^1$ are identical or different and are a hydrocarbon or substituted hydrocarbon radical containing from about 1 to about 12 carbon atoms; and $R^3$ is hydrogen or $R^1$.

16. The method of 9, wherein the metal of the anchor is a Group 3, 4, 5, or 6 metal.

17. The method of claim 16, wherein the metal of the surface modifying treatment agent is selected from the group consisting of Ti, Zr, La, Hf, Ta, W and Nb.

18. The method of claim 11, wherein $R^1$ is of the structure:
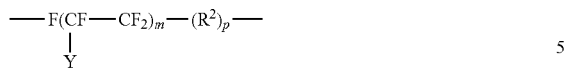
where Y is F or $C_nF_{2n+1}$; m is 4 to 20 and n is 1 to 6; $R^2$ is alkyl containing from 1 to 4 carbon atoms and p is 0 to 18.
19. The method of claim 18, wherein the hydrophobic organo-silicon material is of the formula
$$R^1_{4-x}SiA_x$$
wherein $R^1$ is a fluoro-substituted hydrocarbon and A is $OR^2$.
* * * * *